(12) United States Patent
Yamashita et al.

(10) Patent No.: US 6,761,994 B2
(45) Date of Patent: Jul. 13, 2004

(54) PACKAGING MATERIAL FOR POLYMER CELL AND PROCESS FOR PRODUCING THE SAME

(75) Inventors: Rikiya Yamashita, Shinjuku-Ku (JP); Masataka Okushita, Shinjuku-Ku (JP); Kazuki Yamada, Shinjuku-Ku (JP); Hiroshi Miyama, Shinjuku-Ku (JP)

(73) Assignee: Dai Nippon Printing Co., Ltd. (JP)

(*) Notice: Subject to any disclaimer, the term of this patent is extended or adjusted under 35 U.S.C. 154(b) by 40 days.

(21) Appl. No.: 09/959,782

(22) PCT Filed: Mar. 7, 2001

(86) PCT No.: PCT/JP01/01778
§ 371 (c)(1),
(2), (4) Date: Nov. 7, 2001

(87) PCT Pub. No.: WO01/66433
PCT Pub. Date: Sep. 13, 2001

(65) Prior Publication Data
US 2002/0160212 A1 Oct. 31, 2002

(30) Foreign Application Priority Data
Mar. 8, 2000 (JP) .................................. 2000-062793
Apr. 19, 2000 (JP) .................................. 2000-118300

(51) Int. Cl.$^7$ ........................... H01M 2/02; B32B 15/08
(52) U.S. Cl. ...................... 429/171; 429/174; 429/185; 428/461; 156/334
(58) Field of Search ........................ 428/461; 427/319; 429/163, 175, 176, 171, 174, 185, 164, 165, 166, 167; 148/258, 259, 251, 275; 264/299; 156/339, 320, 322

(56) References Cited
U.S. PATENT DOCUMENTS

| | | | | |
|---|---|---|---|---|
| 4,156,672 A | * | 5/1979 | Fitko et al. .................. 524/484 |
| 4,664,994 A | * | 5/1987 | Koike et al. ................. 429/163 |
| 4,772,650 A | * | 9/1988 | Ou-Yang ..................... 524/271 |
| 5,134,046 A | * | 7/1992 | Chow et al. ................. 429/176 |
| 5,650,243 A | * | 7/1997 | Ferment ...................... 429/162 |
| 6,238,783 B1 | * | 5/2001 | Komai et al. ............. 428/312.8 |
| 6,242,131 B1 | * | 6/2001 | Noh ............................ 429/185 |

FOREIGN PATENT DOCUMENTS

| | | |
|---|---|---|
| EP | 1 102 336 A1 | 5/2001 |
| EP | 1 160 892 A1 | 12/2001 |
| JP | 57170946 A | * 10/1982 |
| JP | XP-002213369 | 6/1984 |
| JP | 59-106957 | 6/1984 |
| JP | XP-002213368 | 2/1986 |
| JP | 61-034183 | 2/1986 |
| JP | 63-92447 | 4/1988 |
| JP | 01-221237 | 9/1989 |
| JP | XP-002213366 | 6/1998 |
| JP | 2000123800 | 10/1998 |
| JP | XP-002213367 | 3/1999 |
| JP | 2000136355 A | * 5/2000 |
| JP | 2001176463 | 6/2001 |

* cited by examiner

Primary Examiner—Paul Thibodeau
Assistant Examiner—Kevin R Kruer
(74) Attorney, Agent, or Firm—Parkhurst & Wendel, L.L.P.

(57) ABSTRACT

A polymer battery module packaging material is a packaging laminated structure (10) including a base layer (11), a first adhesive resin layer (17b), a first chemically converted layer (16b), an aluminum layer (12), a second chemically converted layer (16a), a second adhesive resin layer (17a), a heat-sealable layer (14) and a liquid-paraffin layer (15). The second adhesive resin layer (17a) may be substituted by an acid-denatured polyolefin resin layer (13) formed by extrusion or an acid-denatured polyolefin resin layer (18) formed by coating. The heat-sealable layer (14) is formed of a polyolefin resin. The liquid paraffin layer (15) coating the heat-sealable layer (14) improves the emboss-formability of the polymer battery module packaging material.

28 Claims, 9 Drawing Sheets

PACKAGING MATERIAL FOR POLYMER CELL AND PROCESS FOR PRODUCING THE SAME

This application is a national stage entry of International Application No. PCT/JP01/01778, filed Mar. 7, 2001 designating the U.S., which claims the benefit of Japanese Applications No. 2000-62793 filed Mar. 8, 2000 and 2000-118300 filed Apr. 19, 2000.

TECHNICAL FIELD

The present invention relates to a polymer battery module packaging material having satisfactory moistureproof capability and resistant to chemicals, and a method of manufacturing such a polymer battery module packaging material.

BACKGROUND ART

A polymer battery, which is also known as a lithium secondary battery, has a polyelectrolyte, and positive and negative electrodes formed of active polymers.

The polymer battery (lithium secondary battery) comprises a lithium battery module having a positive electrode collector (aluminum or nickel), a positive electrode active substance layer (metal oxide, carbon black, a metal sulfide, an electrolytic solution or a polymer, such as polyacrylonitrile), an electrolytic layer (an electrolytic solution of propylene carbonate, ethylene carbonate, dimethyl carbonate or ethylene methyl carbonate, an inorganic solid electrolyte of a lithium salt or a gelled electrolyte), a negative electrode active layer (lithium, an alloy, carbon, a liquid electrolyte or a polymer, such as polyacrylonitrile) and a negative collector (copper, nickel or a stainless steel), and a package containing the lithium battery module therein.

The polymer battery is used as a power supply for personal computers, portable terminal devices, such as portable telephones and PDAs, video cameras, electric vehicles, robots, artificial satellites and the like, and as an energy storage battery.

The package of the polymer battery is a cylindrical or parallelepipedic metal can formed by pressing a metal sheet or a pouch formed by working a packaging laminated structure consisting of a base layer, an aluminum layer and a sealant layer.

Packages for polymer batteries have the following problems. The metal can has rigid walls and hence the shape of the battery is dependent on that of the metal can. Since the hardware is designed so as to conform to the shape of the battery, the dimensions of the hardware are dependent on the shape of the battery, which reduces the degree of freedom of designing the shape of the hardware.

A pouch made from a packaging laminated structure for holding a polymer battery therein or an embossed package provided with a hollow for holding a polymer battery therein and formed by pressing a packaging laminated structure has been developed. The embossed package, as compared with a pouch, is compact. Moistureproof capability, piercing strength and insulating property are requisite properties of packages for polymer batteries.

A packaging laminated structure consisting of a base layer, a barrier layer and a heat-sealable layer has been proposed as a packaging material for forming a polymer battery package. It is confirmed that adhesive strength between the layers of the packaging laminated structure affects the requisite properties of a polymer battery package. If adhesive strength between the barrier layer and the heat-sealable layer is insufficient, external moisture penetrates the packaging laminated structure forming a polymer battery package into the polymer battery package, the electrolyte of the polymer battery module reacts with the moisture to produce hydrofluoric acid. The hydrofluoric acid thus produced corrodes the surface of the aluminum layer to cause the delamination of the barrier layer and the heat-sealable layer. An embossed package formed by pressing a packaging laminated structure has a hollow. Sometimes the base layer and the barrier layer of the packaging laminated structure are delaminated when forming the hollow by pressing.

The inventors proved through studies that the adhesive strength between the component layers of a packaging laminated structure can be improved by forming an acid-denatured polypropylene film on a surface of an aluminum layer by a process of applying an emulsion of an acid-denatured polypropylene resin to a surface of the aluminum layer in a film and baking the film, and forming a packaging laminated structure of an adhesive resin layer of an acid-denatured polypropylene resin and a heat-sealable layer of a polypropylene resin by co-extrusion. However, the formation of the acid-denatured polypropylene film by baking takes much time and the packaging laminated structure cannot be produced at a satisfactory production efficiency.

When embossing the packaging laminated structure, friction between an embossing male die and the heat-sealable layer is large, the heat-sealable layer is whitened or fine cracks are formed in the heat-sealable layer, the forming stability is unsatisfactory and, sometimes, cracks and creases are formed when the heat-sealable layer of the packaging laminated structure is formed of a random polypropylene resin.

DISCLOSURE OF THE INVENTION

It is an object of the present invention to provide a polymer battery module packaging material excellent in moistureproof capability and resistance to chemicals, and a method of manufacturing such a polymer battery module packaging material.

According to the present invention, a polymer battery module packaging material includes a base layer, a barrier layer, a chemically converted layer, a heat-sealable layer, and a liquid paraffin layer, wherein the heat-sealable layer is formed of a polyolefin resin.

In the polymer battery module packaging material according to the present invention, the chemically converted layer is formed by a phosphate chromate treatment.

In the polymer battery module packaging material according to the present invention, the heat-sealable layer is formed of a random polypropylene resin.

In the polymer battery module packaging material according to the present invention, the heat-sealable layer is formed of a linear low-density polyethylene resin.

According to the present invention, a polymer battery module packaging material includes a base layer, a barrier layer, a chemically converted layer and a heat-sealable layer, wherein the heat-sealable layer is formed of a thermoplastic resin containing 0.5% to 20% by weight of an additive, the additive is one or some of liquid paraffins, fatty ester lubricants, polyester dispersants, polyglycerol ester additives.

In the polymer battery module packaging material according to the present invention, the chemically converted layer is formed by a phosphate chromate treatment.

In the polymer battery module packaging material according to the present invention, the thermoplastic resin forming the heat-sealable layer is a random propylene resin.

In the polymer battery module packaging material according to the present invention, the thermoplastic resin forming the heat-sealable layer is a linear low-density polyethylene resin.

In the polymer battery module packaging material according to the present invention, the thermoplastic resin forming the heat-sealable layer is a medium-density polyethylene resin.

In the polymer battery module packaging material according to the present invention, the heat-sealable layer is a multilayer structure consisting of two or more layers, and at least the innermost layer of the multilayer structure contains the additive.

According to the present invention, a polymer battery module packaging material manufacturing method includes the steps of processing at least one of the surfaces of a barrier layer by a chemical conversion treatment, laminating a base layer to one of the surfaces of the barrier layer by a dry-lamination process, forming a packaging laminated structure by forming a heat-sealable layer of a random polypropylene resin on the other surface processed by the chemical conversion treatment of the barrier layer by a dry-lamination process, and coating a surface of the heat-sealable layer of the random polypropylene resin with a liquid paraffin.

In the polymer battery module packaging material manufacturing method according to the present invention, both the surfaces of the barrier layer are processed by the chemical conversion treatment.

According to the present invention, a polymer battery module packaging material manufacturing method includes the steps of processing at least one of the surfaces of a barrier layer by a chemical conversion treatment, laminating a base layer to one of the surfaces of the barrier layer by a dry-lamination process, forming a packaging laminated structure by forming a heat-sealable layer by bonding a random polypropylene resin film to the other surface processed by the chemical conversion treatment of the barrier layer with an adhesive resin layer of an acid-denatured polypropylene resin, heating the packaging laminated structure at a temperature not lower than the softening point of the acid-denatured polyolefin resin, and coating a surface of the heat-sealable layer of the random polypropylene resin with a liquid paraffin.

In the polymer battery module packaging material manufacturing method according to the present invention, both the surfaces of the barrier layer are processed by the chemical conversion treatment.

In the polymer battery module packaging material manufacturing method according to the present invention, the heat-sealable layer is bonded to barrier layer with the adhesive resin layer by a sandwich-lamination process.

In the polymer battery module packaging material manufacturing method according to the present invention, the heat-sealable layer is bonded to an aluminum layer with the adhesive resin layer by a coextrusion-lamination process.

In the polymer battery module packaging material manufacturing method according to the present invention, the steps of coating the heat-sealable layer with the liquid paraffin and heating the packaging laminated structure are in-line processes.

In the polymer battery module packaging material manufacturing method according to the present invention, the step of coating the heat-sealable layer with the liquid paraffin is a discrete step to be carried out after the step of heating the packaging laminated structure.

According to the present invention, a polymer battery module packaging material manufacturing method includes the steps of processing at least one of the surfaces of a barrier layer by a chemical conversion treatment, laminating a base layer to one of the surfaces of the barrier layer by a dry-lamination process, forming a packaging laminated structure by heating the other surface processed by the chemical conversion treatment of the barrier layer at a temperature not lower than the softening point of an acid-denatured polypropylene resin and bonding a heat-sealable layer of a random polypropylene resin film to the other surface processed by the chemical conversion treatment of the barrier layer with an adhesive resin layer of the acid-denatured polypropylene resin, and coating a surface of the heat-sealable layer of the random polypropylene resin with a liquid paraffin.

In the polymer battery module packaging material manufacturing method according to the present invention, both the surfaces of the barrier layer are processed by the chemical conversion treatment.

In the polymer battery module packaging material manufacturing method according to the present invention, the adhesive resin layer and the heat-sealable layer are formed on the barrier layer by a sandwich-lamination process.

In the polymer battery module packaging material manufacturing method according to the present invention, the adhesive resin layer and the heat-sealable layer are formed on the barrier layer by a coextrusion-lamination process.

In the polymer battery module packaging material manufacturing method according to the present invention, the steps of coating the surface of the heat-sealable layer with the liquid paraffin and heating the packaging laminated structure are in-line processes.

In the polymer battery module packaging material manufacturing method according to the present invention, the step of coating the heat-sealable layer with the liquid paraffin is a discrete step to be carried out after the step of heating the packaging laminated structure.

According to the present invention, a polymer battery module packaging material manufacturing method includes the steps of processing at least one of the surfaces of a barrier layer by a chemical conversion treatment, laminating a base layer to one of the surfaces of the barrier layer by a dry-lamination process, forming a packaging laminated structure by forming a heat-sealable layer by bonding a film of a linear low-density polyethylene resin to the other surface processed by the chemical conversion treatment of the barrier layer with an adhesive resin layer of an acid-denatured linear low-density polyethylene resin by a sandwich-lamination process, heating the packaging laminated structure at a temperature not lower than the softening point of the acid-denatured linear low-density polyethylene resin, and coating a surface of the heat-sealable layer of the linear low-density polyethylene resin with a liquid paraffin.

In the polymer battery module packaging material manufacturing method according to the present invention, both the surfaces of the barrier layer are processed by the chemical conversion treatment.

According to the present invention, a polymer battery module packaging material manufacturing method includes the steps of processing at least one of the surfaces of a barrier layer by a chemical conversion treatment, laminating a base layer to one of the surfaces of the barrier layer by a dry-lamination process, forming a packaging laminated structure by forming a layer of an acid-denatured polypropylene resin and a film of a random polypropylene resin on the other surface processed by the chemical conversion treatment of the barrier layer by a thermal-lamination process, and coating a surface of the film of the random polypropylene resin of the packaging laminated structure with a liquid paraffin.

In the polymer battery module packaging material manufacturing method according to the present invention, both the surfaces of the barrier layer are processed by the chemical conversion treatment.

BEST MODE FOR CARRYING OUT THE INVENTION

First Embodiment

The present invention provides a polymer battery module packaging material excellent in moistureproof capability and resistance to chemicals, capable of being manufactured at a high productivity, and having a heat-sealable layer resistant to cracking. The construction of packaging laminated structures as polymer battery module packaging materials and methods of manufacturing the packaging laminated structures will be described with reference to the accompanying drawings.

FIGS. 1(a) to 1(d) are typical sectional views showing different types of construction of packaging laminated structures as polymer battery module packaging materials according to the present invention and methods of manufacturing the same. FIGS. 1(a), 1(b), 1(c) and 1(d) show packaging laminated structures formed by methods employing a dry-lamination process, a sandwich-lamination process, a coextrusion-lamination process and a thermal-lamination process, respectively.

Figure 2:
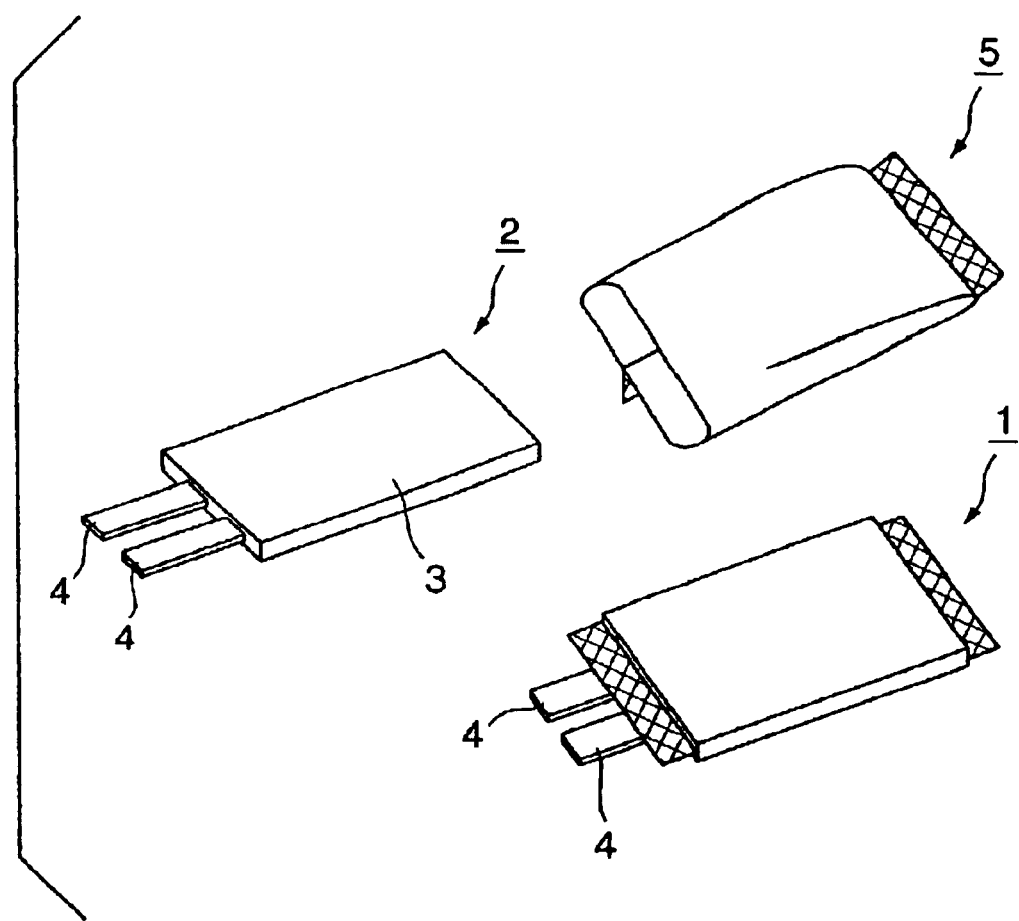
FIG. 2 is a perspective view of assistance in explaining a pouch included in a polymer battery.
Figure 4:
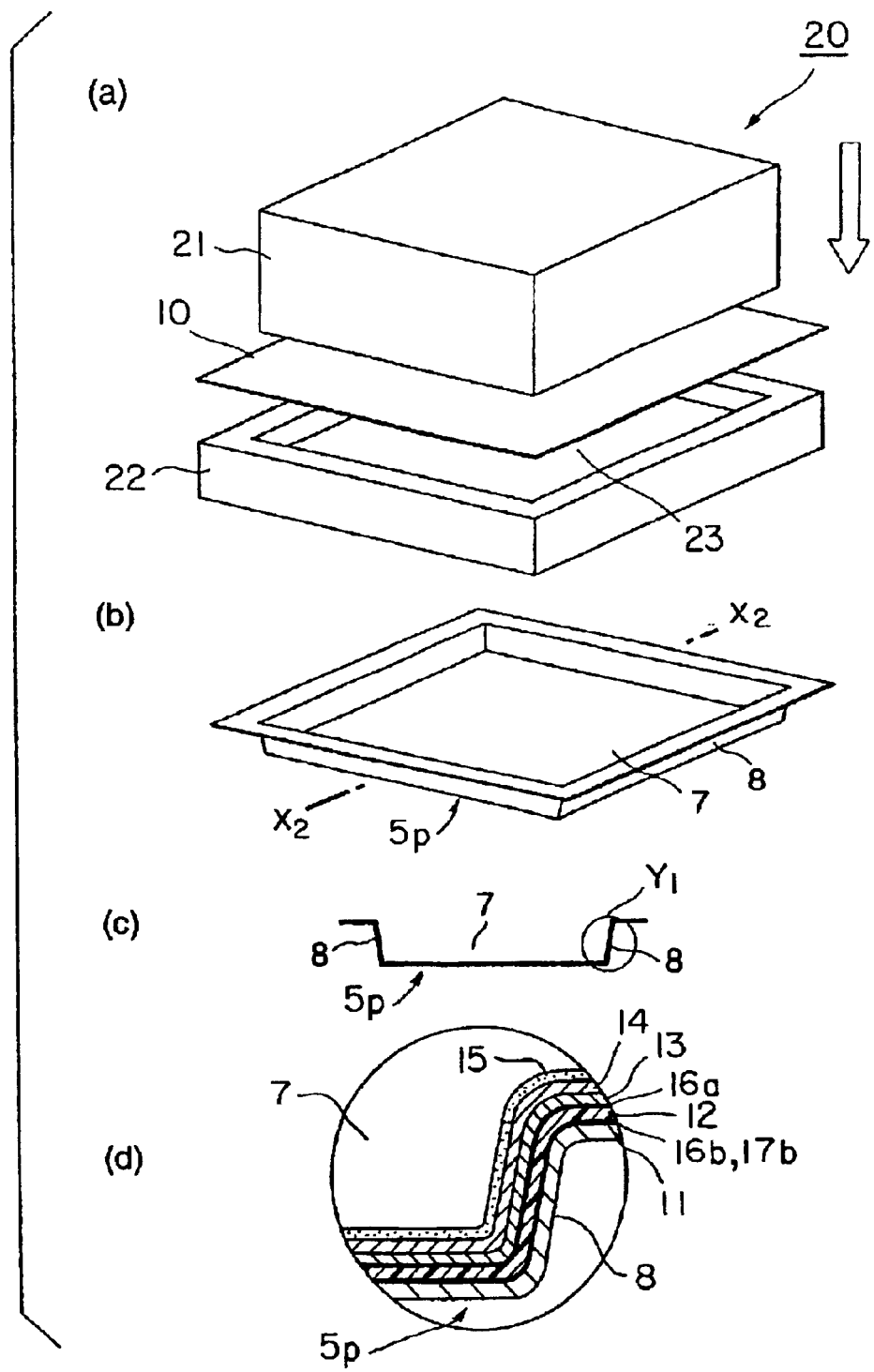
FIG. 4 is a view of assistance in explaining a method of forming an embossed package.
Figure 5:
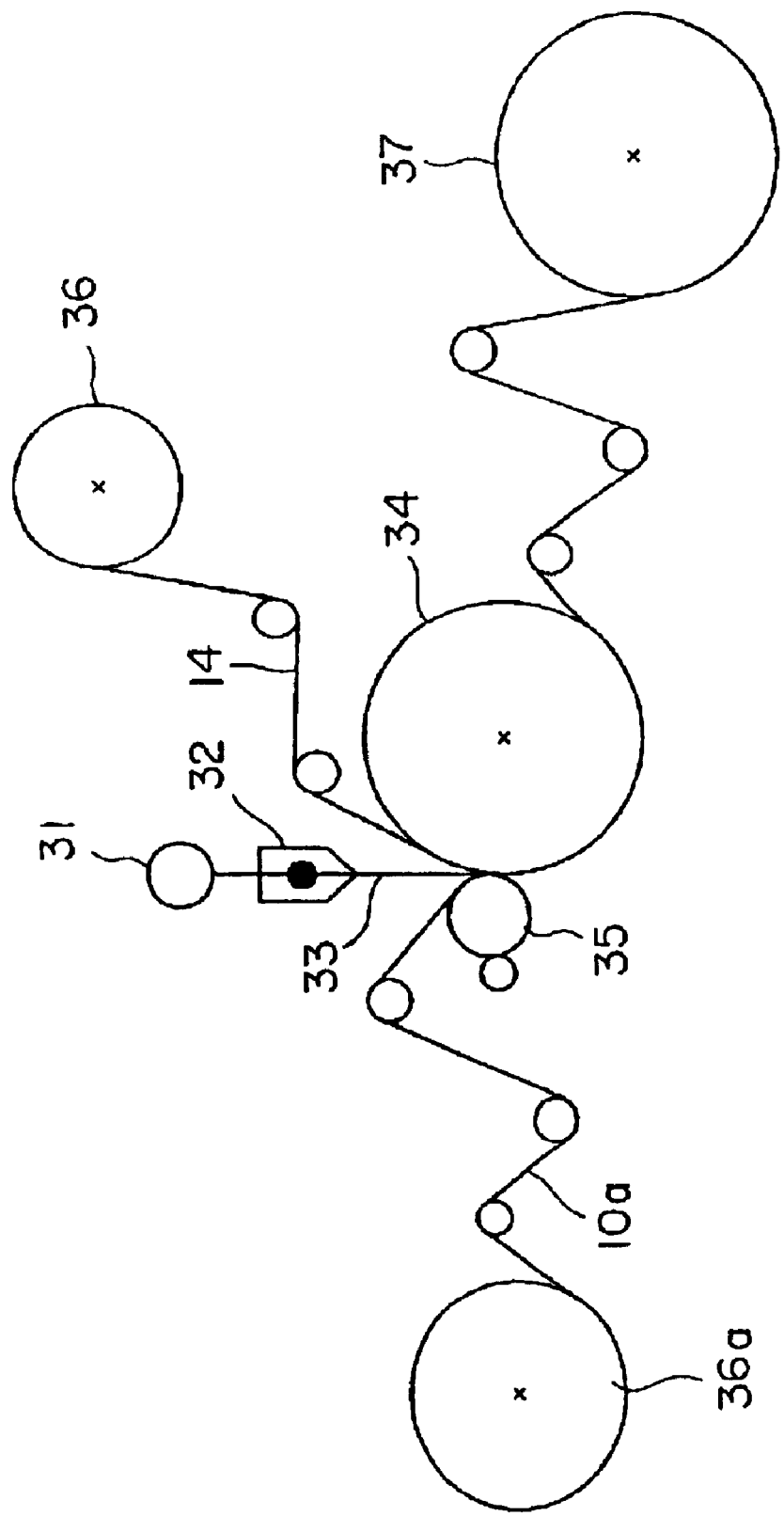
FIG. 5 is a diagrammatic view of assistance in explaining a sandwich-lamination process to be applied to manufacturing a polymer battery module packaging sheet.
Figure 6:
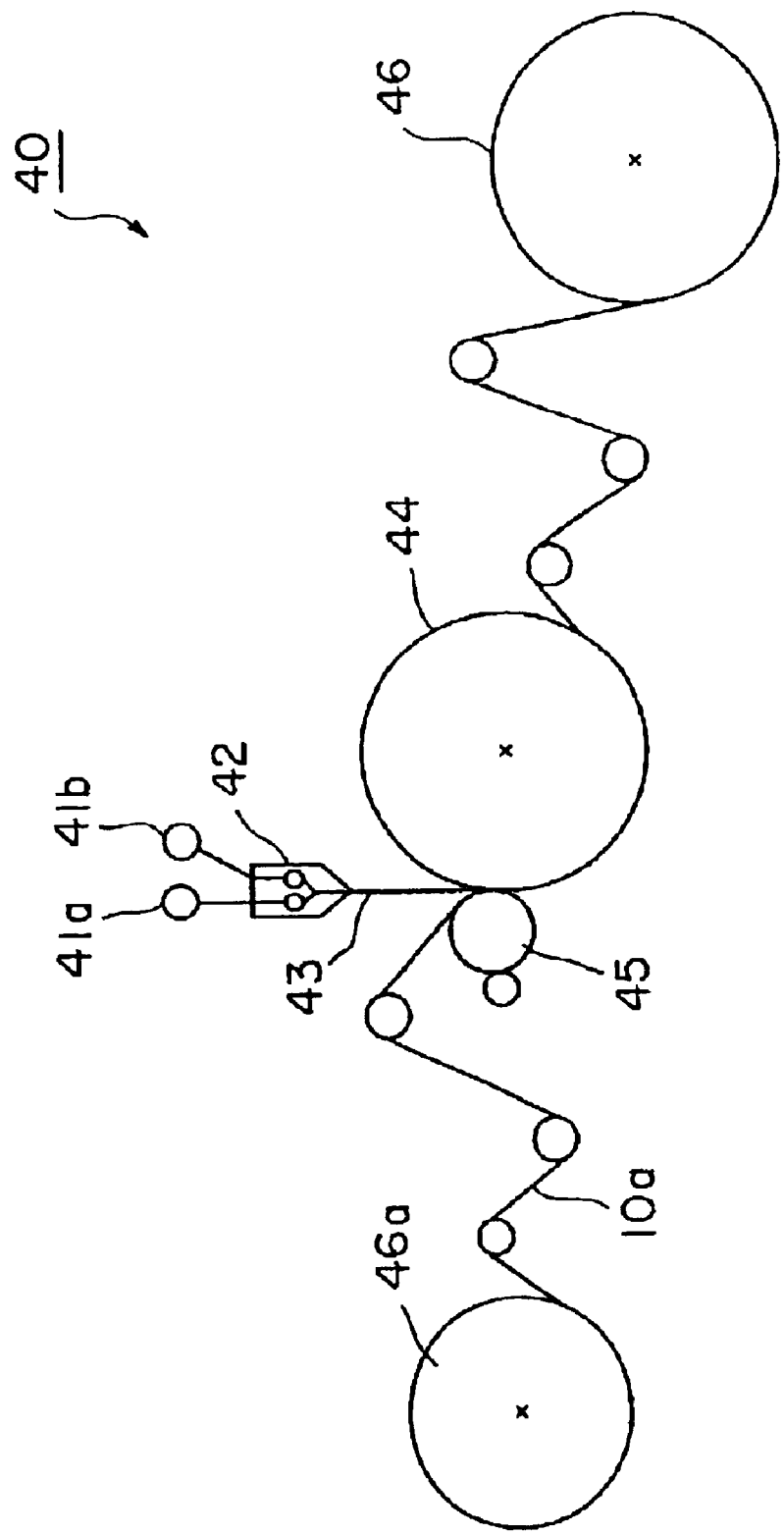
FIG. 6 is a diagrammatic view of assistance in explaining a coextrusion-lamination process to be applied to manufacturing a polymer battery module packaging sheet.
Figure 7:
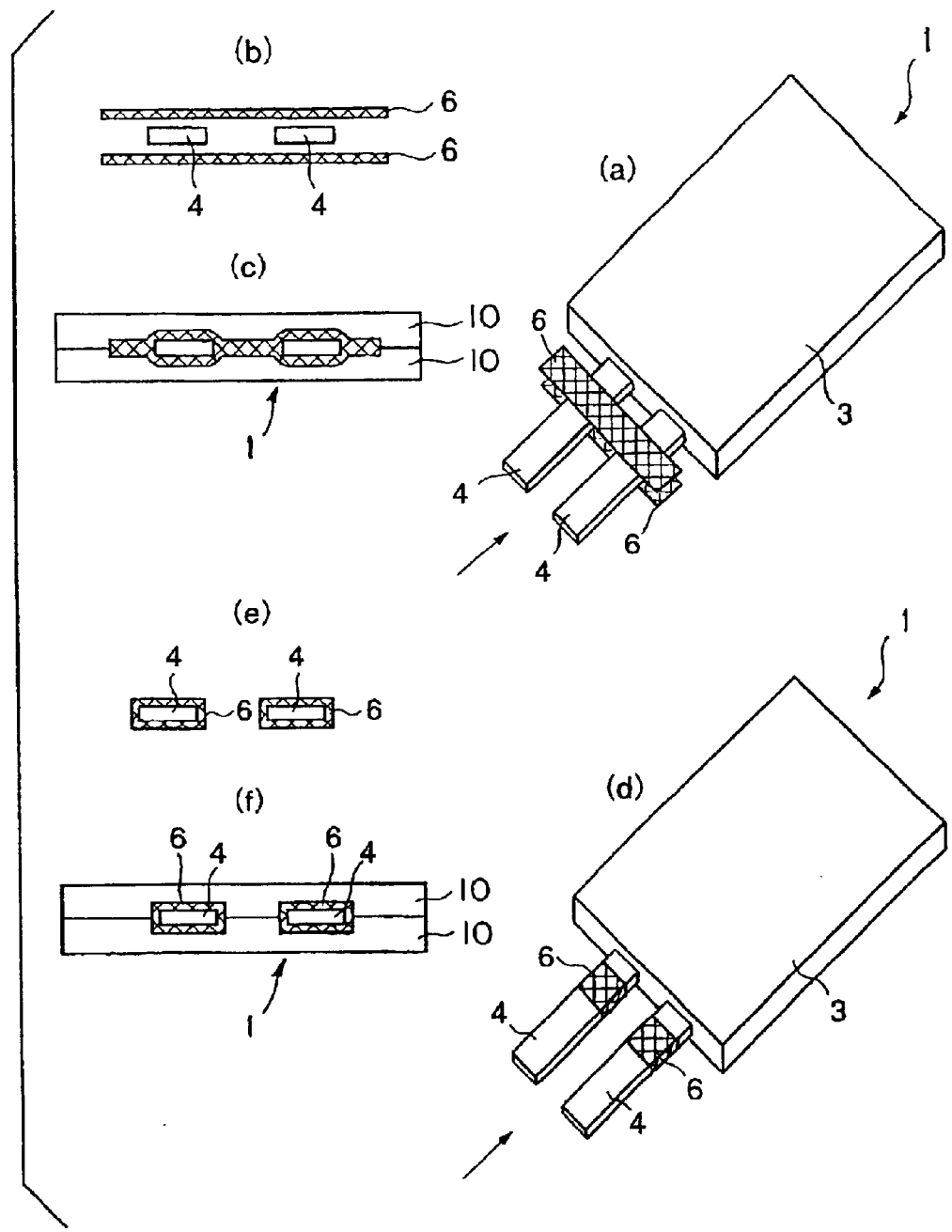
FIG. 7 is a view of assistance in explaining a method of bonding tabs to a polymer battery module packaging material with adhesive films.

FIG. 2 is a perspective view of assistance in explaining a pouch included in a polymer battery, FIGS. 3(a) to 3(e) are views of assistance in explaining an embossed package included in a polymer battery, FIG. 4(a) is a perspective view of assistance in explaining a method of forming an embossed package, FIG. 4(b) is a perspective view of an embossed package, FIG. 4(c) is a sectional view taken on line $X_2$–$X_2$ in FIG. 4(b), FIG. 4(d) is an enlarge view of a part $Y_1$ in FIG. 4(c), FIG. 5 is a diagrammatic view of assistance in explaining a sandwich-lamination process to be applied to manufacturing a polymer battery module packaging material, FIG. 6 is a diagrammatic view of assistance in explaining a coextrusion-lamination process to be applied to manufacturing a polymer battery module packaging material, FIG. 7 is a view of assistance in explaining a method of bonding tabs to a polymer battery module packaging material with adhesive films.

Referring to FIG. 2, a polymer battery 1 includes a polymer battery module 2 having a cell 3 and tabs 4, and a package 5.

Figure 3:
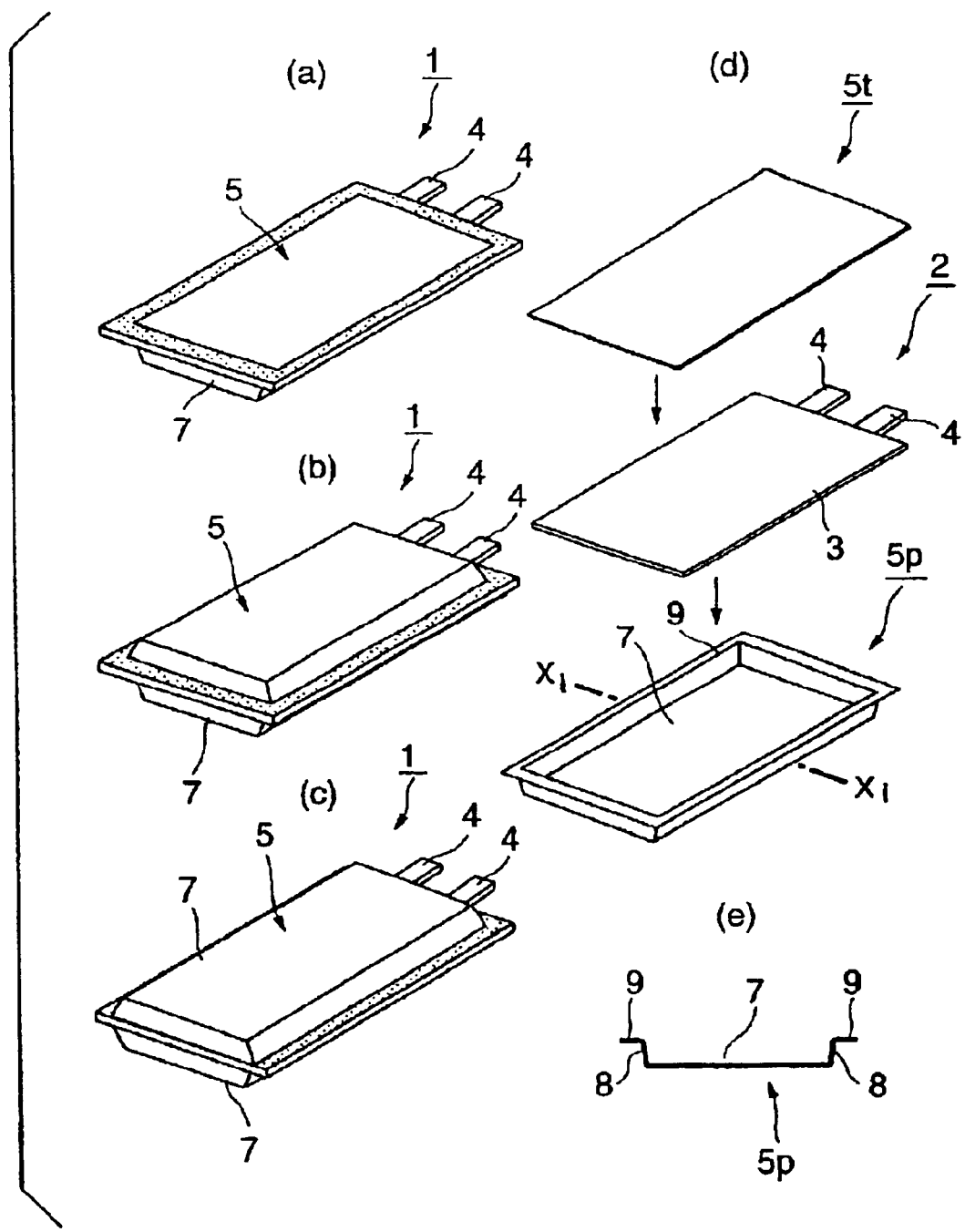
FIG. 3 is a view of assistance in explaining an embossed package included in a polymer battery.

A polymer battery module packaging material forms a package 5 for holding a polymer battery module 2 therein. The package 5 is a pouch as shown in FIG. 2 or an embossed package as shown in FIGS. 3(a), 3(b) or 3(c). The pouch may be a pillow-type pouch as shown in FIG. 2, a three-sided seal pouch or a four-sided seal pouch.

The polymer battery module packaging material according to the present invention is suitable particularly for forming the embossed package 5.

The embossed package 5 may be an embossed package 5 having a hollow part 7 on one side thereof as shown in FIG. 3(a), such as formed by joining together two package parts each having a hollow part 7 and a flange and bonding together the corresponding four sides of the flanges as shown in FIG. 3(b) after putting a polymer battery module 2 therein or such as formed by folding embossed sheets having two package parts each having a hollow part 7 and a flange along a middle line and bonding together the corresponding three sides of the flanges as shown in FIG. 3(c) after putting a polymer battery module 2 therein.

The package 5 shown in FIG. 3(a) includes a package body 5p having a hollow 7 surrounded by side walls 8 and a flange 9 connected to the side walls 8, and a cover 5t joined to the flange 9 by heat-sealing.

When forming an embossed package by embossing a polymer battery module packaging material having construction, nylon film/adhesive resin layer/aluminum foil/adhesive resin layer/heat-sealable layer, and the heat-sealable layer is formed by a sandwich-lamination process, a dry-lamination process, coextrusion-lamination process or a thermal-lamination process, sometimes the aluminum foil and the base layer are separated in parts of the polymer battery module packaging material forming the side walls of the embossed package. Sometimes parts of the polymer battery module packaging material forming the flange of the embossed package are delaminated when the embossed package is subjected to heat-sealing after putting a polymer battery module in the embossed package.

It is preferable to form the heat-sealable layer of a random polypropylene resin from the viewpoint of the protective capability of the polymer battery, the stability of heat-sealed parts, laminating workability and economical effect. Although increase in ethylene content is effective in preventing formation of cracks by embossing or development of cracks by aging, the polymer battery module packaging material does not slide smoothly along an embossing male die, the polymer battery module packaging material is apt to be creased and stable forming work cannot be achieved.

The inventors of the present invention made studied to obtain a laminated polymer battery module packaging material easy to emboss, having a base layer and a barrier layer which are hard to separate and resistant to chemicals and found that a satisfactory polymer battery module packaging material can be obtained by processing both the surfaces of an aluminum foil by a chemical conversion treatment, laminating films of an unsaturated carboxylic acid graft polyolefin resin and a polyolefin resin to the inner surface processed by the chemical conversion treatment of the aluminum foil by a sandwich-lamination process or a coextrusion-lamination process to form a packaging laminated structure, and heating the packaging laminated structure. The present invention has been made on the basis of findings obtained through the studies.

When the inner surface of the heat-sealable layer is coated with a liquid paraffin, the packaging material is able to slide smoothly on the embossing male die and a stable forming process can be achieved. The heat-sealable layer containing the paraffin has a reduced tensile characteristic (Young's modulus) and hence cracks are not formed in the packaging material when the same is subjected to forming.

Figure 1:
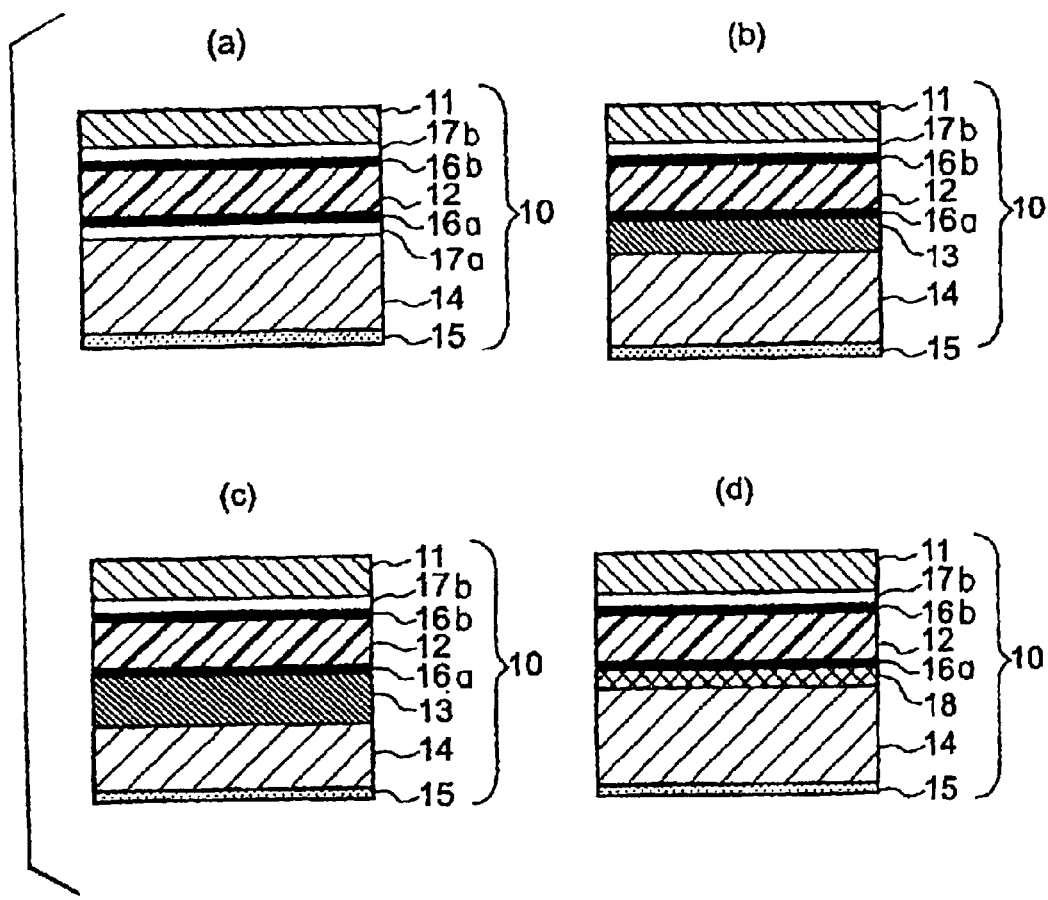
FIG. 1 a typical sectional view of packaging laminated structures as polymer battery module packaging materials in a first embodiment according to the present invention.

As shown in FIG. 1(a), a polymer battery module packaging material of the present invention is a packaging laminated structure 10 including a base layer 11, an adhesive resin layer 17b, a chemically converted layer 16b, an aluminum layer (aluminum foil) 12, a chemically converted layer 16a, an adhesive resin layer 17a, a heat-sealable layer 14 and a liquid-paraffin layer 15.

A dry-lamination process is used for forming the packaging laminated structure shown in FIG. 1(a).

A sandwich-lamination process may be used for forming the packaging laminated structure 10, and an extruded acid-denatured polyolefin resin layer 13 may be used instead of the adhesive resin layer 17a (FIG. 1(b)).

A coextrusion-lamination process may be used for forming the packaging laminated structure 10, and an extruded acid-denatured polyolefin resin layer 13 may be used instead of the adhesive resin layer 17a (FIG. 1(c)).

A thermal-lamination process may be used for forming the packaging laminated structure 10 and an acid-denatured polyolefin resin layer 18 formed by a coating process may be used instead of the adhesive resin layer 17a (FIG. 1(d)).

The chemically converted layer 16b on the side of the base layer 11 is dispensable and is an additional layer.

When the sandwich-lamination process or the coextrusion-lamination process is used, the packaging laminated structure 10 is subjected to preheating or postheating to enhance adhesive strength between the component layers. The liquid-paraffin layer 15 improves the formability of the packaging laminated structure 10 and improves the cracking resistance of the heat-sealable layer 14.

When forming an embossed package 5 of the polymer battery module packaging material, the packaging laminated structure 10 is pressed by using an embossing die 20 having a male die 21 and a female die 22 to form a hollow 7 as shown in FIG. 4. If the heat-sealable layer 14 of the packaging laminated structure 10 does not slide smoothly on the male die 21, some times it is impossible to obtain a stable molding.

The packaging laminated structure 10 having the heat-sealable layer 14 of a random propylene resin is heat-resistant and cracking-resistant, and has stable heat-sealable property and moistureproof capability. An increased ethylene content of the random polypropylene resin is effective in suppressing the formation of cracks in the packaging laminated structure 10. However, the heat-sealable layer 14 formed of a random polypropylene resin having an increased ethylene content increases friction between the heat-sealable layer 14 and the male die 21 and makes the embossing process unstable. If the heat-sealable layer 14 does not slide smoothly on the male die 21, the male die 21 forms abrasions in the surface of the heat-sealable layer 14. The abrasions develop into minute scratches (slight cracks). If the heat-sealable layer 14 is formed of a polyethylene resin, the packaging laminated structure 10 have a bad sliding property because the polyethylene resin is softer than the polypropylene resin, and pinholes are liable to be formed in the packaging laminated structure during embossing.

The inventors of the present invention made studies and found that the sliding property of the packaging laminated structure 10 can be improved and formation of cracks in the packaging laminated structure 10 can be prevented by coating the inner surface of the heat-sealable layer 14 of a random polypropylene resin or a linear low-density polyethylene resin with a liquid-paraffin layer 15, and have made the present invention.

A liquid paraffin for forming the liquid-paraffin layer 15 is a chain hydrocarbon oil having a specific gravity in the range of 0.83 to 0.87, a viscosity in the range of 7.6 to 8.0 $m^2/s$ (37.5° C.), a molecular weight in the range of about 300 to about 500, and a distillation point in the range of 140° to 245° C. at 10 mmHg. Preferably, a liquid paraffin for forming the liquid-paraffin layer 15 of the polymer battery module packaging material of the present invention has a specific gravity of 0.83, a viscosity of 7.7 $mm^2/s$ (37.5° C.), a molecular weight of 300 and a distillation temperature of about 141° C. at 11 mmHg. It is considered that, when the heat-sealable layer 14 of the polymer battery module packaging material of the present invention is coated with the liquid-paraffin layer 15, part or all of the liquid paraffin forming the liquid-paraffin layer 15 permeates the heat-sealable layer 14 of a polypropylene resin or a polyethylene resin. Consequently, the heat-sealable layer 14 swells, softens and becomes stretchable.

Thus, the tensile property (Young's modulus) of the heat-sealable layer 14 of the polypropylene resin changes and the properties of the heat-sealable layer 14 of the polypropylene resin become more similar to those of a heat-sealable layer formed of a polyethylene resin. A heat-sealable layer of a polyethylene resin is satisfactory in resistance to whitening and cracking, but the same is unsatisfactory in heat resistance and sliding property. The present invention uses a heat-sealable layer having heat resistance comparable to that of a heat-sealable layer formed of a polypropylene resin and satisfactory in formability.

Coating the heat-sealable layer 14 of a polyethylene resin with the liquid-paraffin layer 15 is effective not only in improving the sliding property of the packaging laminated structure 10 but also in improving the formability of the packaging laminated structure 10 by the permeation of the liquid paraffin into the heat-sealable layer 14.

When the heat-sealable layer 14 is coated with the liquid-paraffin layer 15, stress induced in the packaging laminated structure by embossing is distributed, cracks in the inner surface of the packaging laminated structure 10 are reduced or formation of cracks is prevented, and the liquid paraffin serves as a lubricant to improve the sliding property of the packaging laminated structure.

The liquid-paraffin coating 15 can be formed by a gravure coating method (direct or reverse), a three-reverse-roll coating method, a kiss-roll coating method or a spray-coating method. A preferable weight per unit area of the liquid-paraffin layer 15 is in the range of 2 to 6 g/m².

Materials of the component layers of the packaging laminated structure 10, i.e., the packaging laminated material according to the present invention, will be described hereinafter with reference to FIGS. 1(a) to 1(d).

The base layer 11 is a film of an oriented polyester resin or an oriented nylon resin. Possible polyester resins are polyethylene terephthalate resins, polybutylene terephthalate resins, polyethylene naphthalate resins, polybutylene naphthalate resins, interpolyester resins, polycarbonate resins and the like. Possible nylons, i.e., polyamide resins, are nylon 6, nylon 66, copolymers of nylon 6 and nylon 66, nylon 610, polymethaxylilene adipamide (MXD6) and the like.

When the polymer battery is used on a device (hardware), the base layer 11 touches the device. Therefore, it is desirable to form the base layer 11 of an intrinsically insulating resin. Since a film forming the base layer 11 has pinholes and pinholes will be formed in the film during processing, the thickness of the baselayer 11 must be 6 $\mu$m or above. Preferably, the thickness of the base layer 11 is in the range of 12 to 25 $\mu$m.

The base layer 11 may be a laminated film in view of providing the base layer 11 with a high pinhole-resistant property and an improved insulating ability.

Preferably, the base layer 11 includes at least one resin layer consisting of two or more layers each having a thickness of 6 $\mu$m or above, preferably, in the range of 12 to 25 $\mu$m. The following packaging laminated structures 1) to 7) are examples of the laminated base layer 11.
1) Oriented PET resin layer/oriented nylon layer
2) Oriented nylon layer/Oriented PET layer To improve the mechanical aptitude (stability when passed through processing machines and a packaging machine) and surface protecting ability (heat resistance and electrolyte resistance) of the packaging sheet and to reduce friction between a die and the base layer 11 when forming the embossed package body and to protect the base layer 11 from the electrolyte, it is preferable that the base layer 11 consists of plural layers and the surface of the base layer 11 is coated with a coating of a fluorocarbon resin, an acrylic resin, a silicone resin or a polyester resin. The base layer 11 may be any one of the following laminated films.
3) Fluorocarbon resin layer/Oriented PET resin layer (the fluorocarbon resin layer may be a fluorocarbon resin film or a film formed by spreading a liquid fluorocarbon resin in a film and drying the same.)
4) Silicone resin layer/Oriented PET resin layer (the silicone resin layer may be a silicone resin film or a film formed by spreading a liquid silicone resin in a film and drying the same.)
5) Fluorocarbon resin layer/Oriented PET resin layer/Oriented nylon layer
6) Silicone resin layer/Oriented PET resin layer/Oriented nylon layer
7) Acrylic resin layer/Oriented nylon layer (the acrylic resin layer may be an acrylic resin film or a film formed by spreading an acrylic resin and drying the same.)

The aluminum layer (barrier layer) 12 prevents the penetration of moisture into the polymer battery 1. To avoid the adverse effect of pinholes that may be formed in the barrier layer 12, to stabilize the workability (ease of fabricating pouches or embossing) and to provide the barrier layer 12 with pinhole resistance, the barrier layer 12 has a thickness of 15 $\mu$m or above and is formed from a foil of a metal, such as aluminum or nickel, or a film coated with an inorganic compound, such as silicon dioxide or alumina, by evaporation. Preferably, the barrier layer 12 is an aluminum foil of a thickness in the range of 20 to 80 $\mu$m.

The inventors of the present invention made studies to reduce pinholes and to prevent the cracking of an embossed battery package and found that an aluminum having an iron content in the range of 0.3 to 9.0% by weight, preferably, in the range of 0.7 to 2.0% by weight is more satisfactory in ductility than aluminum not containing any iron, and an aluminum foil of such aluminum is less subject to the formation of pinholes when a laminated sheet including the aluminum foil of such aluminum is folded and is more capable of facilitating forming walls of an embossed battery package than an aluminum foil of aluminum not containing any iron. Aluminum having an iron content less than 0.3% by weight is unable to form a satisfactorily pinhole-resistant foil and does not have improved formability. Aluminum having an iron content exceeding 9.0% by weight is unsatisfactory in flexibility and affects adversely to the workability of the packaging laminated structure in forming a pouch.

The flexibility, stiffness and hardness of an aluminum foil formed by cold rolling are dependent on annealing conditions. The present invention prefers rather soft, slightly or completely annealed aluminum foils to those treated by a hardening process and not annealed.

Annealing conditions that affect the flexibility, stiffness and hardness of aluminum foils may be properly determined according to the required workability (ease of forming pouches or embossed packages) of the packaging laminated structure. For example, to prevent the formation of creases or pinholes in making a package by an embossing process, a soft aluminum foil properly annealed according to the degree of embossing may be used.

The inventors of the present invention found through studies that a satisfactory packaging laminated structure can be formed by using an aluminum foil having opposite surfaces processed by a chemically conversion treatment as the barrier layer 12. The chemical conversion treatment forms an acid-resistant film of a phosphate, a chromate, a fluoride or a triazine thiol compound. Thus the separation of the aluminum foil 12 and the base layer 11 during an embossing process can be prevented, the dissolution and corrosion of the surfaces of the aluminum foil 12, particularly, aluminum oxide films coating the aluminum foil, by hydrogen fluoride produced by the interaction of the electrolyte of the polymer battery module and moisture can be effectively prevented, the adhesive property (wettability) of the surface of the aluminum foil 12 is improved, the separation of the base layer and the aluminum foil during an embossing process and a heat-sealing process can be prevented and the separation of the aluminum foil and the innermost layer due to the effect of hydrogen fluoride produced by the interaction between the electrolyte and moisture can be effectively prevented by the chemical conversion treatment of the aluminum foil. Only the inner surface of the barrier layer 12 on the side of the heat-sealable layer 14 may be processed by the chemical conversion treatment.

It was found through experimental chemical conversion treatment using various substances that chemical conversion treatment method using a mixture of a phenolic resin, trivalent chromium phosphate compound and phosphoric acid has satisfactory effect.

When the packaging laminated sheet is intended for forming embossed packages 5, the separation of the aluminum foil 12 and the base layer 11 during an embossing process can be prevented by processing both the surfaces of the aluminum foil 12 by the chemical conversion treatment.

When laminating the acid-denatured polypropylene resin layer 13 and the heat-sealable layer 14 (polypropylene resin film) to the chemically converted layer 16a of the packaging laminated structure 10 by a sandwich-lamination process or a coextrusion-lamination process, it is possible that the acid-denatured polyolefin resin forming the acid-denatured polyolefin resin layer 13 cannot be satisfactorily bonded to the chemically converted layer 16a. The inventors of the present invention found that the adhesive strength between the acid-denatured polyolefin resin layer 13 and the chemically converted layer 16a is enhanced when an emulsion of an acid-denatured polypropylene resin is spread on the chemically converted layer 16a in a film by a roll-coating process or the like, the film is dried, the dried film is baked at a temperature in the range of 170° to 200° C. and the acid-denatured polypropylene resin layer 13 and the heat-sealable layer 14 are laminated to the chemically converted layer 16a. However, a baking process for baking the film processes the film very slowly and the productivity of the baking process is low.

The inventors of the present invention made studies to develop a laminating method capable of bonding those layers by stable adhesive strength without forming and baking the film of the acid-denatured propylene resin and found that a packaging laminated structure having layers bonded by a predetermined adhesive strength can be obtained by bonding a base layer 11 to one of the surfaces processed by a chemical conversion treatment of a barrier layer 12 by a dry-lamination process, extruding an acid-denatured polyolefin resin layer 13 on the other surface of the barrier layer 12 and bonding a heat-sealable layer (polypropylene resin film) 14 to the acid-denatured polyolefin resin layer 13 by a sandwich-lamination process or by laminating an acid-denatured polypropylene resin layer 13 and a heat-sealable layer (polypropylene resin) 14 to the other surface of the barrier layer 12 by a coextrusion process, and heating the packaging laminated structure 10 at a temperature not lower than the softening point of the acid-denatured polypropylene resin.

The packaging laminated structure 10 may be heated by any one of a contact heating method using a hot roller, a hot air heating method using hot air and an infrared heating method using near or far infrared rays, provided that the acid-denatured polypropylene resin can be heated at a temperature not lower than the softening point thereof.

The adhesive strength of the packaging laminated structure 10 can be stabilized also by heating the surface facing the heat-sealable layer 14 of the aluminum foil 12 up to the softening point of the acid-denatured polypropylene resin layer 13.

An acid-denatured polypropylene is used as a bonding resin when the heat-sealable layer 14 is formed of a polypropylene resin. An acid-denatured polyethylene resin or a polyethylene resin is used as a bonding resin when the heat-sealable layer 14 is formed of a polyethylene resin. When a polyethylene resin is used as a bonding resin, a surface facing the aluminum foil of the extruded, molten resin film of the polyethylene resin is treated with ozone during lamination.

The packaging laminated structures 10, i.e., the polymer battery module packaging materials of the present invention, may be provided with an intermediate layer of a biaxially oriented film of a polyimide resin, a PET resin or the like between the barrier layer 12 and the adhesive resin layer 17a, between the barrier layer 12 and the acid-denatured polyolefin resin layer 13, and between the barrier layer 12 and the acid-denatured polyolefin resin layer 18, respectively. The intermediate layer enhances the strength of the polymer battery module packaging material, and improves and stabilizes the impermeability of the polymer battery module packaging material. Sometimes, the intermediate layer is used to prevent short circuit resulting from tabs 4 of a polymer battery module and the barrier layer 12 in a heat-sealing process.

The component layers of the packaging laminated structure may be processed by a surface activating treatment, such as a corona discharge treatment, a blasting treatment, an oxidation treatment or ozone treatment, to improve and stabilize film forming property, lamination property, formability (ease of forming pouches or embossed packages).

The heat-sealable layer 14 of the packaging laminated structure 10 of the present invention is a single-layer film of a polyolefin resin, such as a random propylene resin, a homopropylene resin or a block propylene resin, a single-layer film of a blend of some of those resins, or a multilayer film consisting of films of some of those resins. A random propylene resin is suitable for forming the heat-sealable layer 14.

The heat-sealable layer 14 may be a single-layer or multilayer film of a linear low density polyethylene resin or a middle-density polyethylene resin, or a single-layer or multilayer film of a blend of a linear low-density polyethylene resin and a middle-density polyethylene resin.

A low-crystalline ethylene-butene copolymer, a low-crystalline propylene-butene copolymer, an ethylene-butene-propylene terpolymer, an antiblocking agent (AB agent), such as silica, zeolite, acrylic resin beads, or a fatty acid amide lubricant may be added to the random propylene resin, the homopropylene resin, the block propylene resin, the linear low density polyethylene resin and the middle-density polyethylene resin.

Desirably, the heat-sealable layer 14 is formed of the random polypropylene resin. Layers of the random polypropylene resin can be easily bonded together by heat-sealing, have protective properties including a moistureproof property and a heat resistance required of the heat-sealable layer 14 of the polymer battery module packaging material, can be easily laminated to the barrier layer, and are satisfactory in emboss-formability.

Desirably, a random polypropylene resin for forming the heat-sealable layer 14 has a density of 0.90 g/cm$^3$ or above, a Vicat softening point of 115° C. or above and a melting point of 120° C. or above. Desirably, a linear low-density polyethylene resin or a middle-density polyethylene resin for forming the heat-sealable layer 14 has a density of 0.91 g/cm$^3$ or above, a Vicat softening point of 70° C. or above and a melting point of 110° C. or above.

The use of the heat-sealable layer 14 of a random propylene resin makes the packaging laminated structure flexible, improves the bending resistance of the packaging laminated structure and prevents formation of cracks during formation. The slipperiness of the surface of the heat-sealable layer 14 is low if the ethylene content of the heat-sealable layer 14 is large. The present invention coats the inner surface of the heat-sealable layer 14 of a random polypropylene resin with a liquid paraffin to reduce the Young's modulus of the heat-sealable layer 14, to enhance the stretching property of the heat-sealable layer 14 and to make the slipperiness of the surface of the heat-sealable layer 14 satisfactory.

A method of manufacturing the packaging laminated structure 10 employing a sandwich-lamination process will be described with reference to FIG. 5. Referring to FIG. 5, when manufacturing the packaging laminated sheet 10 shown, a laminated film 10a consisting of the base layer 11, the adhesive resin layer 17b, the chemically converted layer 16b, the aluminum foil 12 and the chemically converted layer 16a is unwound from a laminated film roll 36a, a heat-sealable film for forming the heat-sealable layer 14 is unwound from a heat-sealable film roll 36, the laminated film 10a and the heat-sealable film for forming the heat-sealable layer 14 are joined and pressed together between a chill roller 34 and a pressure roller 35, and a molten resin film 33 of an acid-denatured polyolefin resin is extruded between the laminated film 10a to form the packaging laminated structure 10. The packaging laminated sheet 10 thus formed is rolled in a packaging laminated structure roll 37.

A method of manufacturing the packaging laminated structure 10 employing a coextrusion-lamination process will be described with reference to FIG. 6. Referring to FIG. 6, when manufacturing the packaging laminated sheet 10, a laminated film 10a consisting of the base layer 11, the adhesive resin layer 17b, the chemically converted layer 16b, the aluminum foil 12 and the chemically converted layer 16a is unwound from a laminated film roll 46a and is held between a chill roller 44 and a pressure roller 45. Meanwhile, a molten resin film 43 consisting of a molten resin film of an acid-denatured polyolefin resin and a molten resin film a polyolefin resin is extruded through a die 42 by extruders 41a and 41b onto a surface of the laminated film 10a to form the packaging laminated structure 10. The packaging laminated sheet 10 thus formed is rolled in a packaging laminated structure roll 46.

The random polypropylene resin and the polyethylene resin forming the heat-sealable layer 14 or the liquid paraffin forming the liquid paraffin layer 15 cannot be bonded to a metal member by heat-sealing. Therefore, when bonding the tabs 4 of the polymer battery 1 to the packaging laminated structures 10, adhesive films 6 that can be bonded to both a metal member and the heat-sealable layer 14 by heat-sealing are interposed between the tabs 4 and the heat-sealable layers 14 of the packaging laminated structures 10 as shown in FIGS. 7(a), 7(b) and 7(c) to ensure that gaps between the tables 4 and the heat-sealable layers 14 are sealed. The adhesive films 6 may be wound round predetermined parts of the tabs 4 as shown in FIGS. 7(d), 7(e) and 7(f).

The adhesive film 6 may be formed of the unsaturated carboxylic acid graft polyolefin resin, a metal-crosslinked polyethylene resin, or a copolymer of ethylene or propylene, and acrylic acid or methacrylic acid.

Desirably, the base layer 11 of the polymer battery module packaging material of the present invention is bonded to the chemically converted layer 16b of the barrier layer 12 by a dry-lamination process.

Possible adhesives for bonding the base layer 11 to the chemically converted layer 16b formed by a phosphate chromate treatment by a dry-lamination process are polyester adhesives, polyethylene-imine adhesives, polyether adhesives, cyanoacrylate adhesives, urethane adhesives, organic titanium adhesives, polyether-urethane adhesives, epoxy adhesives, polyester-urethane adhesives, imide adhesives, isocyanate adhesives, polyolefin adhesives, silicone adhesives and such.

EXAMPLES

Examples of the polymer battery module packaging materials of the present invention will be described.

The chemical conversion treatment for processing the aluminum foil 12 used an aqueous solution of a phenolic resin, a trivalent chromium fluoride compound and phosphoric acid as a processing liquid. The processing liquid was applied to the surface of the aluminum foil 12 by a roll coating method in a film, and the film was baked at 180° C. or above. The weight per unit area of the film was 10 mg/m$^2$ (dry weight).

One-side pressed type embossed packages 5 each provided with a hollow part were formed by processing packaging laminated structures 10 in the following examples and comparative examples by using an embossing die 20 having a female die 22 provided with a cavity of 30 mm×50 mm×3.5 mm, and the formability of the packaging laminated structures 10 was evaluated.

When sealing a polymer battery module 1 in the embossed packages 5, 50 μm thick adhesive films 6 of an unsaturated carboxylic acid graft linear low-density polypropylene resin were wound round the tabs 4 of the polymer battery module 1 to seal gaps between the embossed package 5 and the tabs 4 by heat-sealing.

Example 1-1

Both the surfaces of a 40 μm thick aluminum foil were subjected to a chemical conversion treatment. A 25 μm thick oriented nylon film was laminated to one of the surfaces of the aluminum foil by a dry-lamination process. The other chemically converted surface of the aluminum foil was heated with infrared rays and hot air to a temperature not lower than the softening point of an acid-denatured polypropylene resin, i.e., an adhesive resin. A 30 μm thick film of a random polypropylene resin having an ethylene content of 4% for forming a heat-sealable layer was laminated to the other surface of the aluminum foil with a 20 μm thick film of the acid-denatured polypropylene resin by a sandwich-lamination process to form a primary laminated structure. The inner surface of the film of the random polypropylene resin was coated with a liquid paraffin film of 4 g/m$^2$ (wet state) by a reverse-roll gravure coating method using a coating machine to obtain a sample packaging laminated structure in Example 1-1.

Example 1-2

Both the surfaces of a 40 μm thick aluminum foil were subjected to a chemical conversion treatment. A 25 μm thick oriented nylon film was laminated to one of the surfaces of the aluminum foil by a dry-lamination process. The other chemically converted surface of the aluminum foil was heated with infrared rays and hot air to a temperature not lower than the softening point of an acid-denatured polypropylene resin, i.e., an adhesive resin. A 30 μm thick film of a random polypropylene resin having an ethylene content of 7% for forming a heat-sealable layer was laminated to the other surface of the aluminum foil with a 30 μm thick film of an acid-denatured polypropylene resin by a sandwich-lamination process to form a primary laminated structure. The inner surface of the random polypropylene resin film was coated with a liquid paraffin film of 4 g/m$^2$ (wet state) by a reverse-roll gravure coating method using the apparatus used for forming the primary structure to obtain a sample packaging laminated structure in Example 1-2.

Example 1-3

Both the surfaces of a 40 μm thick aluminum foil were subjected to a chemical conversion treatment. A 25 μm thick oriented nylon film was laminated to one of the surfaces of the aluminum foil by a dry-lamination process. A 30 μm thick film of a random polypropylene resin having an ethylene content of 4% for forming a heat-sealable layer was laminated to the other surface of the aluminum foil with a 20 μm thick film of an acid-denatured polypropylene resin by a sandwich-lamination process to form a primary laminated structure. The primary laminated structure was heated with hot air to a temperature not lower than the softening point of the acid-denatured polypropylene resin, and the inner surface of the random polypropylene resin film was coated with a liquid paraffin film of 4 g/m$^2$ (wet state) by a reverse-roll gravure coating method using a coating machine to obtain a sample packaging laminated structure in Example 1-3.

Example 1-4

Both the surfaces of a 40 μm thick aluminum foil were subjected to a chemical conversion treatment. A 25 μm thick oriented nylon film was laminated to one of the surfaces of the aluminum foil by a dry-lamination process. A 30 μm thick film of a random polypropylene resin having an ethylene content of 7% for forming a heat-sealable layer was laminated to the other surface of the aluminum foil with a 20 μm thick film of an acid-denatured polypropylene resin by a sandwich-lamination process to form a primary laminated structure. The primary laminated structure was heated with hot air to a temperature not lower than the softening point of the acid-denatured polypropylene resin after coating the inner surface of the random polypropylene resin film with a liquid paraffin film of 4 g/m$^2$ (wet state) by a reverse-roll gravure coating method using a coating machine to obtain a sample packaging laminated structure in Example 1-4.

Example 1-5

Both the surfaces of a 40 μm thick aluminum foil were subjected to a chemical conversion treatment. A 25 μm thick oriented nylon film was laminated to one of the surfaces of the aluminum foil by a dry-lamination process. A 30 μm thick film of a random polypropylene resin having an ethylene content of 4% for forming a heat-sealable layer was laminated to the other surface of the aluminum foil with a 20 μm thick film of an acid-denatured polypropylene resin by a coextrusion-lamination process to form a primary laminated structure. The primary laminated structure was heated with hot air to a temperature not lower than the softening point of the acid-denatured polypropylene resin, and the inner surface of the random polypropylene resin film was coated with a liquid paraffin film of 4 g/m$^2$ (wet state) by a reverse-roll gravure coating method using a coating machine. The laminated structure coated with the liquid paraffin coating was heated at a temperature not lower than the softening point of the acid-denatured polypropylene resin in the same coating machine to obtain a sample packaging laminated structure in Example 1-5.

Example 1-6

Both the surfaces of a 40 μm thick aluminum foil were subjected to a chemical conversion treatment. A 25 μm thick oriented nylon film was laminated to one of the surfaces of the aluminum foil by a dry-lamination process. A 30 μm thick film of a random polypropylene resin having an ethylene content of 10% for forming a heat-sealable layer was laminated to the other surface of the aluminum foil with a 20 μm thick film of an acid-denatured polypropylene resin by a coextrusion-lamination process to form a primary laminated structure. The primary laminated structure was heated with hot air to a temperature not lower than the softening point of the acid-denatured polypropylene resin after coating the inner surface of the random polypropylene resin film with a liquid paraffin film of 2 g/m$^2$ (wet state) by a reverse-roll gravure coating method in the same apparatus to obtain a sample packaging laminated structure in Example 1-6.

Example 1-7

Both the surfaces of a 40 μm thick aluminum foil were subjected to a chemical conversion treatment. A 25 μm thick oriented nylon film was laminated to one of the surfaces of the aluminum foil by a dry-lamination process. A 30 μm thick film of a random polypropylene resin having an ethylene content of 4% for forming a heat-sealable layer was laminated to the other surface of the aluminum foil by a dry-lamination process and the inner surface of the film of the random polypropylene resin was coated with a liquid paraffin film of 6 g/m$^2$ (wet state) by a reverse-roll gravure coating method to obtain a sample packaging laminated structure in Example 1-7.

Example 1-8

Both the surfaces of a 40 μm thick aluminum foil were subjected to a chemical conversion treatment. A 25 μm thick oriented nylon film was laminated to one of the surfaces of the aluminum foil by a dry-lamination process. The other chemically converted surface of the aluminum foil was coated with a film of an acid-denatured polypropylene resin by a roll coating method and the film was dried at 180° C. for 3 s (seconds) to form a 3 μm thick adhesive resin film. A 30 μm thick film of a random polypropylene resin having an ethylene content of 7% for forming a heat-sealable layer was laminated to the other surface of the aluminum foil with the adhesive resin film by a thermal-lamination process to form a primary laminated structure. The inner surface of the film of the random polypropylene resin was coated with a liquid paraffin film of 4 g/m$^2$ (wet state) by a reverse-roll gravure coating method in the same apparatus to obtain a sample packaging laminated structure in Example 1-8.

Example 1-9

Both the surfaces of a 40 μm thick aluminum foil were subjected to a chemical conversion treatment. A 12 μm thick biaxially oriented polyester film and a 15 μm thick biaxially oriented nylon film were laminated to one of the surfaces of the aluminum foil by a dry-lamination process with the nylon film bonded to the aluminum foil to form a two-layer base layer. The other chemically converted surface of the aluminum foil was coated with a film of an acid-denatured polypropylene resin by a roll coating method and the film was dried at 180° C. for 3 s (seconds) to form a 3 μm thick adhesive resin film. A 30 μm thick film of a random polypropylene resin having an ethylene content of 7% for forming a heat-sealable layer was laminated to the other surface of the aluminum foil with the adhesive resin film by a thermal-lamination process to form a primary laminated structure. The inner surface of the film of the random polypropylene resin was coated with a liquid paraffin film of 4 g/m$^2$ (wet state) by a reverse-roll gravure coating method using a coating machine to obtain a sample packaging laminated structure in Example 1-9.

Example 1-10

Both the surfaces of a 40 μm thick aluminum foil were subjected to a chemical conversion treatment. A 25 μm thick oriented nylon film was laminated to one of the surfaces of the aluminum foil by a dry-lamination process. The other chemically converted surface of the aluminum foil was coated with a 20 μm thick adhesive resin film of an acid-denatured polypropylene resin to obtain a base structure. Such base structures as the foregoing base structure were laminated to heat-sealable layers specified in 1) to 7), respectively, by a sandwich-lamination process to obtain primary laminated structures. The inner surfaces of the heat-sealable layers were coated with a liquid paraffin film of 4 g/m² (wet state) by a reverse-roll gravure coating method to obtain seven sample packaging laminated structures in Example 1-10.

1) Random propylene resin film (25 μm thick)/Homopropylene resin film (5 μm thick)

2) Random propylene resin film (5 μm thick)/Homopropylene resin film (20 μm thick)/random propylene resin film (5 μm thick)

3) Homopropylene resin film (25 μm thick)/random propylene resin film (5 μm thick)

4) Random propylene resin+Terpolymer (100:20)

5) Random propylene resin+Ethylene-butene copolymer (100:15)

6) Random propylene resin+Homopropylene resin (20:80)

7) Random propylene resin+Homopropylene resin (80:20)

Note: "/" indicates lamination, "+" indicates blending, and the parenthesized ratio indicates the ratio of contents in part by weight.

Example 1-11

Both the surfaces of a 40 μm thick aluminum foil were subjected to a chemical conversion treatment. A 25 μm thick oriented nylon film was laminated to one of the surfaces of the aluminum foil by a dry-lamination process. A 30 μm thick film of a linear low-density polyethylene having an ethylene content of 4% for forming a heat-sealable layer was laminated to the other surface of the aluminum foil with a 20 μm thick film of an acid-denatured linear low-density polyethylene resin by a sandwich-lamination process to form a primary laminated structure. The inner surface of the film of the linear low-density polyethylene resin was heated with hot air at a temperature not lower than the acid-denatured linear low-density polyethylene resin and the same inner surface was coated with a liquid paraffin film of 4 g/m² (wet state) by a reverse-roll gravure coating method using a coating machine to obtain a sample packaging laminated structure in Example 1-11.

Example 1-12

Both the surfaces of a 40 μm thick aluminum foil were subjected to a chemical conversion treatment. A 25 μm thick oriented nylon film was laminated to one of the surfaces of the aluminum foil by a dry-lamination process. A 20 μm thick molten adhesive resin film of a medium-density polyethylene resin was extruded onto the other surface of the aluminum foil and a 30 μm thick film of a linear low-density polyethylene for forming a heat-sealable layer was laminated to the other surface of the aluminum foil by a sandwich-lamination process, ozonizing a surface of the molten adhesive resin film facing the aluminum foil to form a primary laminated structure. The inner surface of the film of the linear low-density polyethylene resin was coated with a liquid paraffin film of 4 g/m² (wet state) by a reverse-roll gravure coating method. Then, the primary laminated structure was heated with hot air in the same apparatus at a temperature not lower than the softening point of the acid-denatured polyethylene resin to obtain a sample packaging laminated structure in Example 1-12

Comparative Example 1-1

Both the surfaces of a 40 μm thick aluminum foil were subjected to a chemical conversion treatment. A 25 μm thick oriented nylon film was laminated to one of the surfaces of the aluminum foil by a dry-lamination process. The other surface of the aluminum foil was heated at a temperature not lower than the softening point of an acid-denatured polypropylene resin for forming an adhesive resin film with infrared rays and hot air, and a 30 μm thick film of a random polypropylene resin having an ethylene content of 4% for forming a heat-sealable layer was laminated to the other surface of the aluminum foil with a 20 μm thick film of the acid-denatured polypropylene resin by a sandwich-lamination process to obtain a sample packaging laminated structure in Comparative example 1-1.

Comparative Example 1-2

Both the surfaces of a 40 μm thick aluminum foil were subjected to a chemical conversion treatment. A 25 μm thick oriented nylon film was laminated to one of the surfaces of the aluminum foil by a dry-lamination process. The other surface of the aluminum foil was heated at a temperature not lower than the softening point of an acid-denatured polypropylene resin for forming an adhesive resin film with infrared rays and hot air, and a 30 μm thick film of a random polypropylene resin having an ethylene content of 7% for forming a heat-sealable layer was laminated to the other surface of the aluminum foil with a 20 μm thick film of the acid-denatured polypropylene resin by a sandwich-lamination process to obtain a sample packaging laminated structure in Comparative example 1-2.

Comparative Example 1-3

Both the surfaces of a 40 μm thick aluminum foil were subjected to a chemical conversion treatment. A 25 μm thick oriented nylon film was laminated to one of the surfaces of the aluminum foil by a dry-lamination process. A 30 μm thick film of a random polypropylene resin having an ethylene content of 4% for forming a heat-sealable layer was laminated to the other surface of the aluminum foil with a 20 μm thick adhesive resin film of an acid-denatured polypropylene resin by a sandwich-lamination process to obtain a primary laminated structure. The primary laminated structure was heated with hot air at a temperature not lower than the softening point of the acid-denatured polypropylene resin to obtain a sample packaging laminated structure in Comparative example 1-3.

Comparative Example 1-4

One of the surfaces of a 40 μm thick aluminum foil was subjected to a chemical conversion treatment. A 25 μm thick oriented nylon film was laminated to the other surface not processed by the chemical conversion treatment of the aluminum foil by a dry-lamination process. A 30 μm thick film of a random polypropylene resin having an ethylene content of 7% for forming a heat-sealable layer was laminated to the surface processed by the chemical conversion treatment of the aluminum foil with a 20 μm thick film of an acid-denatured polypropylene resin by a sandwich-lamination process to obtain a primary laminated structure.

The primary laminated structure was heated with hot air at a temperature not lower than the softening point of the acid-denatured polypropylene resin to obtain a sample packaging laminated structure in Comparative example 1-4.

Comparative Example 1-5

One of the surfaces of a 40 μm thick aluminum foil was subjected to a chemical conversion treatment. A 25 μm thick oriented nylon film was laminated to the other surface not processed by the chemical conversion treatment of the aluminum foil by a dry-lamination process. A 30 μm thick film of a random polypropylene resin having an ethylene content of 4% for forming a heat-sealable layer was laminated to the surface processed by the chemical conversion treatment of the aluminum foil with a 20 μm thick film of an acid-denatured polypropylene resin by a coextrusion-lamination process to obtain a primary laminated structure. The primary laminated structure was heated with hot air so that the surface of the aluminum foil is heated at a temperature not lower than the softening point of the acid-denatured polypropylene resin to obtain a sample packaging laminated structure in Comparative example 1-5.

Comparative Example 1-6

Both the surfaces of a 40 μm thick aluminum foil were subjected to a chemical conversion treatment. A 25 μm thick oriented nylon film was laminated to the one of the surfaces of the aluminum foil by a dry-lamination process. A 30 μm thick film of a random polypropylene resin having an ethylene content of 7% for forming a heat-sealable layer was laminated to the other surface of the aluminum foil with a 20 μm thick film of an acid-denatured polypropylene resin by a coextrusion-lamination process to obtain a primary laminated structure. The primary laminated structure was heated with hot air at a temperature not lower than the softening point of the acid-denatured polypropylene resin to obtain a sample packaging laminated structure in Comparative example 1-6.

Comparative Example 1-7

One of the surfaces of a 40 μm thick aluminum foil was subjected to a chemical conversion treatment. A 25 μm thick oriented nylon film was laminated to the other surface not processed by the chemical conversion treatment of the aluminum foil by a dry-lamination process. A 30 μm thick film of a random polypropylene resin having an ethylene content of 4% for forming a heat-sealable layer was laminated to the surface processed by the chemical conversion treatment of the aluminum foil by a dry-lamination process to obtain a sample packaging laminated structure in Comparative example 1-7.

Comparative Example 1-8

Both the surfaces of a 40 μm thick aluminum foil were subjected to a chemical conversion treatment. A 25 μm thick oriented nylon film was laminated to one of the surfaces of the aluminum foil by a dry-lamination process. A 3 μm thick adhesive resin layer was formed by forming a film of an acid-denatured polypropylene resin on the other surface of the aluminum foil by a roll coating method and drying the film at 180° C. for 2 s (seconds). A 30 μm thick film of a random polypropylene resin having an ethylene content of 4% for forming a heat-sealable layer was laminated to the surface coated with the adhesive resin layer of the aluminum foil by a thermal-lamination process to obtain a sample packaging laminated structure in Comparative example 1-8.

Method of Evaluation

1) Formability

Packaging laminated structures forming sample embossed packages were inspected for pinholes.

2) Changes in Surface of Heat-sealable Layer after Embossing

The surfaces of the heat-sealable layers of the packaging laminated structures forming the sample embossed packages were inspected visually immediately after embossing for whitening (slight cracking).

3) Delamination

Sample embossed packages were subjected to a heat-sealing process under process conditions of 190° C. in heating temperature, 5 s in heating time and 98 N/cm$^2$ in sealing pressure immediately after embossing. The packaging laminated structures forming the heat-sealed sample embossed packages were inspected for the separation of the base layer and the aluminum foil after being held at 90° C. for 24 hr.

4) Chemical Resistance

Packaging laminated structures forming the sample embossed packages were inspected for the separation of the aluminum foil and the heat-sealable layer after keeping the sample embossed packages in an atmosphere of 60° C. and 90% RH in a thermostat for seven days.

Results

Pinholes were not formed at all in all the sample packaging laminated structures in Examples 1-1 to 1-12. None of the heat-sealable layers of the sample packaging laminated structures in Examples 1-1 to 1-12 was whitened by forming. None of the base layers of the sample packaging laminated structures in Examples 1-1 to 1-12 was separated from the aluminum foil by embossing. None of the sample packaging laminated structures in Examples 1-1 to 1-12 was delaminated by the agency of chemicals.

Five hundred sample packaging laminated structures in each of Comparative examples 1-1 to 1-8 were tested. Pinholes were formed in one or two of the five hundred sample packaging laminated structures in each of Comparative examples 1-1 to 1-8. The heat-sealable layers of one to three of the five hundred sample packaging laminated structures in each of Comparative examples 1-1 to 1-8 were slightly whitened by embossing.

Sample packaging laminated structures in Comparative examples 1-1 to 1-8 were not delaminated by the agency of chemicals. The base layers of the sample packaging laminated structures in Comparative examples 1-4. 1-5 and 1-7 were separated from the aluminum foils.

The chemical conversion treatment of the surfaces of the aluminum foil prevents the separation of the base layer and the aluminum foil of the polymer battery module packaging materials of the present invention during an embossing process and heat-sealing. When the heat-sealable layer is bonded to the aluminum foil by a sandwich-lamination process or a coextrusion-lamination process, heating the laminated structure during the fabrication or after the fabrication of the same prevents effectively the corrosion of the surface of the aluminum foil by hydrogen fluoride that may be produced by interaction between the electrolyte of the polymer battery module and moisture. The liquid paraffin coating covering the inner surface of the heat-sealable layer improves the emboss-formability of the packaging laminated structure, stabilizes the forming process even if the heat-sealable layer is formed of a random polypropylene resin or a polyethylene resin having low slipperiness and prevents the formation of cracks in the heat-sealable layer.

Second Embodiment

A polymer battery module packaging structure in a second embodiment according to the present invention is a moistureproof polymer battery module packaging laminated sheet (lithium ion battery module packaging material) resistant to chemicals, capable of being manufactured at a high productivity and having a heat-sealable layer resistant to cracking. The polymer battery module packaging material and a method of manufacturing the same will be described with reference to the accompanying drawing.

FIG. 8(a) is a typical sectional view of a packaging laminated structure formed by a method using a dry-lamination process, FIG. 8(b) is a typical sectional view of a packaging laminated structure formed by a method using a sandwich lamination process, FIG. 8(c) is a typical sectional view of a packaging laminated structure formed by a method using a coextrusion lamination process, and FIG. 8(d) is a typical sectional view of a packaging laminated structure formed by a method using a thermal-lamination process.

Figure 9:
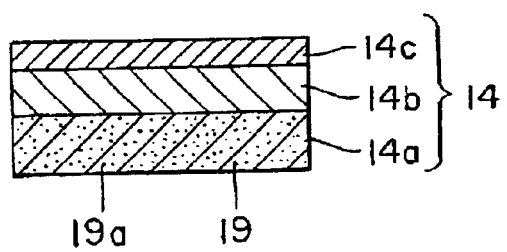
FIG. 9 is a typical sectional view of a laminated heat-sealable layer.

FIG. 9 is a typical sectional view of a laminated heat-sealable layer.

FIGS. 10(a) to 10(d) are typical sectional views of packaging laminated structures in modifications of the second embodiment. FIG. 10(a) is a typical sectional view of a packaging laminated structure formed by a method using a dry-lamination process, FIG. 10(b) is a typical sectional view of a packaging laminated structure formed by a method using a sandwich lamination process, FIG. 10(c) is a typical sectional view of a packaging laminated structure formed by a method using a coextrusion lamination process, and FIG. 10(d) is a typical sectional view of a packaging laminated structure formed by a method using a thermal-lamination process.

A lithium ion battery module packaging material forms a package 5 for holding a polymer battery module 2 therein. The package 5 is a pouch as shown in FIG. 2 or an embossed package as shown in FIGS. 3(a), 3(b) or 3(c). The pouch may be a pillow-type pouch as shown in FIG. 2, a three-sided seal pouch or a four-sided seal pouch. FIG. 2 shows a pillow-type pouch.

The polymer battery module packaging material according to the present invention is suitable particularly for forming the embossed package 5.

The embossed package 5 may be an embossed package 5 having a hollow part 7 on one side thereof as shown in FIG. 3(a), such as formed by joining together two package parts each having a hollow part 7 and a flange and bonding together the corresponding four sides of the flanges as shown in FIG. 3(b) after putting a polymer battery module 2 therein or such as formed by folding embossed sheets having two package parts each having a hollow part 7 and a flange along a middle line and bonding together the corresponding three sides of the flanges as shown in FIG. 3(c) after putting a polymer battery module 2 therein.

The inventors of the present invention made studies to obtain a laminated polymer battery module packaging material easy to emboss, having a base layer and a barrier layer which are hard to separate during embossing or heat-sealing, and satisfactory in resistance to chemicals as a package 5 for holding a polymer battery module (lithium ion battery module) therein and found that a satisfactory polymer battery module packaging material can be obtained by processing both the surfaces of an aluminum foil by a chemical conversion treatment, laminating films of an unsaturated carboxylic acid graft polyolefin resin and a polyolefin resin to the inner surface processed by the chemical conversion treatment of the aluminum foil by a sandwich-lamination process or a coextrusion-lamination process to form a packaging laminated structure, and heating the packaging laminated structure. The present invention has been made on the basis of findings obtained through the studies.

The inventors of the present invention found that it is effective in stabilizing the emboss-formability of a packaging laminated structure for forming a lithium ion battery module package to form the heat-sealable layer of the packaging laminated structure of a thermoplastic resin containing 0.5% to 20% by weight of one or some of liquid paraffins, fatty acid ester lubricants, dispersants, such as polyester surface active agents, and antifogging agents, such as polyglycerol ester, and have made the present invention. The additive may be added to a resin for forming the heat-sealable layer 14, such as a random polypropylene resin, a linear low-density polyethylene resin or a medium-density polyethylene resin or the innermost surface of the lithium ion battery module packaging material may be coated with the additive.

The additive may be added to a resin for forming the heat-sealable layer as shown in FIGS. 8(a) to 8(d). The inner surface of the heat-sealable layer may be coated with the additive or a coating material prepared by dispersing the additive in a binder as shown in FIGS. 10(a) to 10(d).

When adding the additive to the heat-sealable layer by coating the inner surface of the heat-sealable layer with a layer of the additive, the coated surface of the heat-sealable layer may be heated after being coated with the layer of the additive.

Preferably, the heat-sealable layer containing the additive is a multilayer structure. It is preferable, when the heat-sealable layer is a multilayer structure as shown in FIG. 9, that the innermost resin layer contains the additive. Addition of the additive only to the innermost resin layer prevents the reduction of bond strength between the heat-sealable layer and the adjacent layer.

The heat-sealable layer containing the additive makes the packaging laminated structure slide smoothly on an embossing male die 21 (FIG. 4), stabilizes a forming process and improves tensile characteristic (reduces Young's modulus). Consequently, cracks are not formed in the heat-sealable layer when the packaging laminated structure is subjected to forming.

Figure 8:
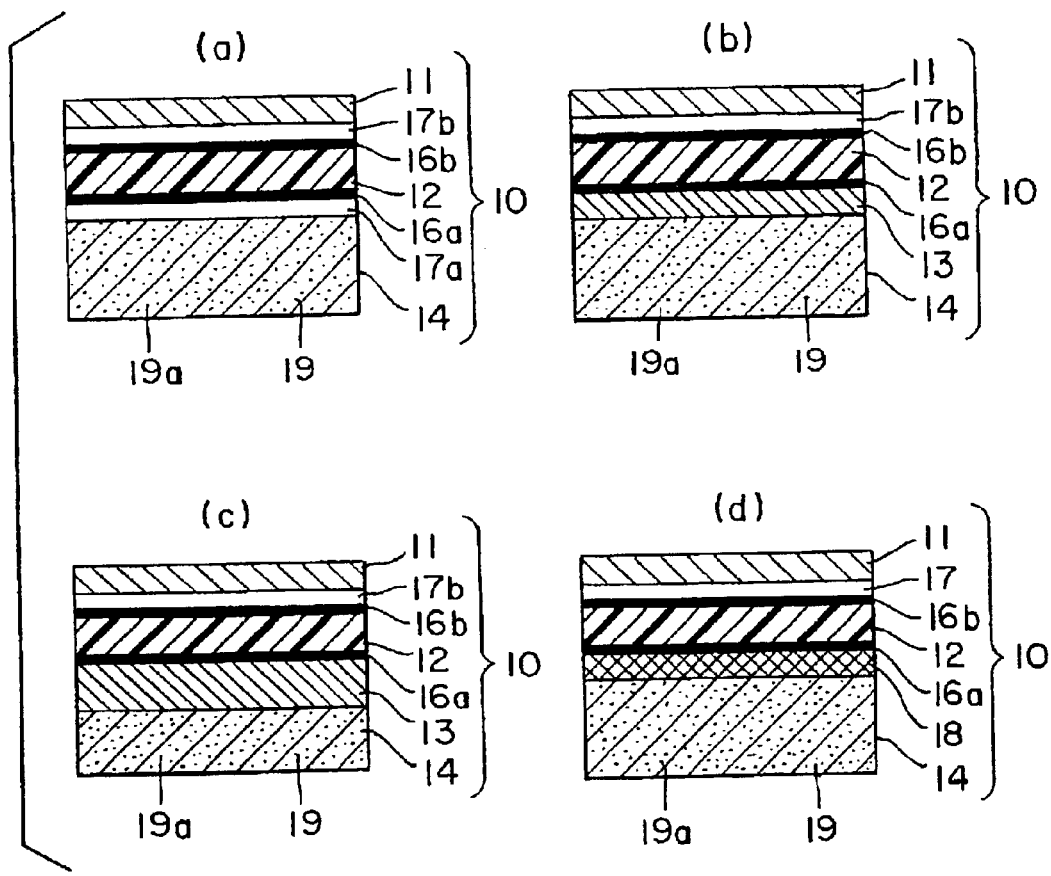
FIG. 8 is a typical sectional view of packaging laminated structures in a second embodiment according to the present invention.
Figure 10:
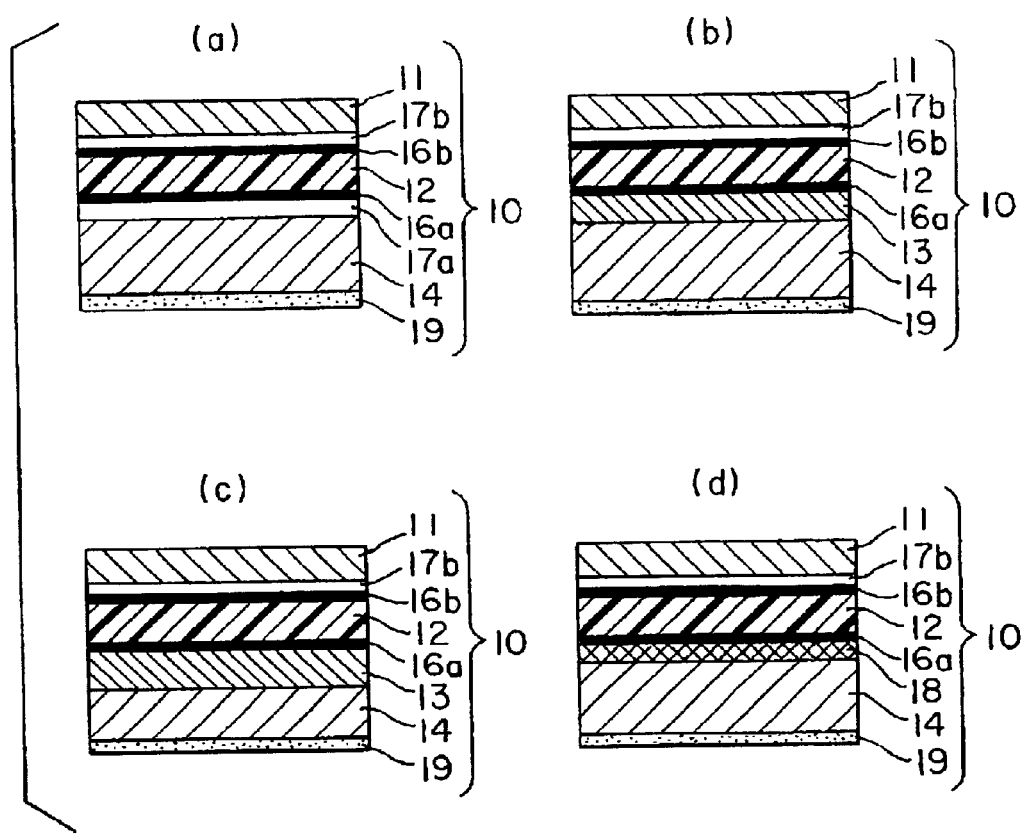
FIG. 10 is a typical sectional view of polymer battery module packaging materials in a third embodiment according to the present invention.

FIGS. 8 to 10 show laminated structures 10 of the present invention as lithium ion battery module packaging materials.

FIG. 8(a) shows a packaging laminated structure 10 fabricated by a method using a dray-lamination process. The packaging laminated structure 10 includes a base layer 11, an adhesive resin layer 17b, a chemically converted layer 16b, an aluminum layer (aluminum foil) 12, a chemically converted layer 16a, an adhesive resin layer 17a, and a heat-sealable layer 14. The heat-sealable layer 14 is formed of a mixture of a thermoplastic resin 19a and 0.5% to 20% by weight of an additive 19. The additive 19 is one of some liquid paraffins, an fatty acid ester lubricant, a polyester dispersant and polyglycerol ester.

The chemically converted layer 16b of the packaging laminated structure 10 shown in FIG. 8(a) is not necessarily indispensable and is an additional chemically converted layer.

A sandwich-lamination process may be used for forming the packaging laminated structure 10, and an extruded acid-denatured polyolefin resin layer 13 may be used instead of the adhesive resin layer 17a as shown in FIG. 8(b).

A coextrusion-lamination process may be used for forming the packaging laminated structure 10, and an extruded acid-denatured polyolefin resin layer 13 may be used instead of the adhesive resin layer 17a as shown in FIG. 8(c).

A thermal-lamination process may be used for forming the packaging laminated structure 10 and an acid-denatured polyolefin resin layer 18 formed by a coating process may be used instead of the adhesive resin layer 17a as shown in FIG. 8(d).

Each of the heat-sealable layer 14 of the laminated structures 10 shown in FIGS. 8(a) to 8(d) may be a multilayer heat-sealable layer 14 consisting of layers 14a, 14b and 14c as shown in FIG. 9. The innermost layer 14c of the multilayer heat-sealable layer 14 shown in FIG. 9 may be formed of the mixture of the thermoplastic resin 19a and the additive 19.

The heat-sealable layers 14 of the laminated structures 10 shown in FIGS. 8(a) to 8(d) may be coated with an additive layer of the additive 19 as shown in FIGS. 10(a) to 10(d).

Packaging laminated structures shown in FIGS. 8(a), 8(b), 8(c) and 8(d) correspond to those shown in FIGS. 10(a), 10(b), 10(c) and 10(d), respectively.

The packaging laminated structure 10 formed by the method using a sandwich-lamination process shown in FIG. 8(b) and the packaging laminated structure 10 formed by the method using a coextrusion-lamination process shown in FIG. 8(c) may be subjected to preheating or postheating to enhance adhesive strength between the component layers. The additive 19 improves the formability of the packaging laminated structure 10 and improves the resistance to cracking of the heat-sealable layer 14.

When forming an embossed package 5 of the polymer battery module packaging material, the packaging laminated structure 10 is pressed to form a hollow 7 as shown in FIGS. 4(a) to 4(d). If the heat-sealable layer 14 of the packaging laminated structure 10 does not slide smoothly on a male die 21, some times it is impossible to obtain a stable molding.

The lithium ion battery module packaging material having the heat-sealable layer 14 of a random propylene resin is heat-resistant and cracking-resistant, and has stable heat-sealable property and moistureproof capability. An increased ethylene content of the random polypropylene resin is effective in suppressing the formation of cracks in the packaging laminated structure 10. However, the heat-sealable layer 14 formed of a random polypropylene resin having an increased ethylene content increases friction between the heat-sealable layer 14 and the male die 21 and makes the embossing process unstable. If the heat-sealable layer 14 does not slide smoothly on the male die 21, the male die 21 forms abrasions in the surface of the heat-sealable layer 14. The abrasions develop into minute scratches (slight cracks). If the heat-sealable layer 14 is formed of a polyethylene resin, the packaging laminated structure 10 have a bad sliding property because the polyethylene resin is softer than the polypropylene resin, and pinholes are liable to be formed in the packaging laminated structure during embossing. The heat-sealable layer 14 containing the additive of the packaging laminated structure of the present invention is free from those problems.

A liquid paraffin, i.e., one of the additives 19 which can be used by the present invention, is a chain hydrocarbon oil having a specific gravity in the range of 0.83 to 0.87, a viscosity in the range of 7.6 to 8.0 $mm^2/s$ (37.5° C.), a molecular weight in the range of about 300 to about 500, and a distillation point in the range of 140° to 245° C. at 10 mmHg. Preferably, a liquid paraffin which is used by the present invention has a specific gravity of 0.83, a viscosity of 7.7 $mm^2/s$ (37.5° C.), a molecular weight of 300 and a distillation temperature of about 141° C. at 10 mmHg.

Possible fatty acid ester lubricants include butyl stearate, a mixture of butyl stearate butyl and a liquid paraffin, ester waxes and alkylphosphate. A mixture of butyl stearate butyl and a liquid paraffin is particularly effective. Polyglycerol ester is a preferable antifogging agent.

A heat-sealable layer 14 containing the additive 19 may be formed of a mixture of the thermoplastic resin 19a and the additive 19 (FIG. 8). The inner surface of the heat-sealable layer 14 may be coated with the additive 19 or a coating liquid containing the additive 19 (FIG. 10).

It is considered that, when the heat-sealable layer 14 of the polymer battery module packaging material of the present invention contains the additive 19, part or all of the additive 19 permeates the heat-sealable layer 14 of a polypropylene resin or the polyethylene resin and, consequently, the heat-sealable layer 14 swells, softens and becomes stretchable.

Thus, the tensile property (Young's modulus) of the heat-sealable layer 14 of the polypropylene resin changes and the properties of the heat-sealable layer 14 of the polypropylene resin become more similar to those of a heat-sealable layer formed of a polyethylene resin. A heat-sealable layer of a polyethylene resin is satisfactory in resistance to whitening and cracking, but the same is unsatisfactory in heat resistance and sliding property. The present invention uses a heat-sealable layer having heat resistance comparable to that of a heat-sealable layer formed of a polypropylene resin and satisfactory in formability.

A heat-sealable layer formed of a mixture of a polyethylene resin and the additive 19 or a heat-sealable layer containing the additive 19 added thereto by coating the same with the additive 19 has improved slipperiness (FIG. 8), increased stretchability and improved formability (FIG. 10).

When the heat-sealable layer 14 contains the additive 19, stress induced in the packaging laminated structure by embossing is distributed, cracks in the heat-sealable layer 14 are reduced or formation of cracks is prevented. The liquid paraffin, i.e., the additive 19, coating the heat-sealable layer 14 serves as a lubricant to improve the sliding property of the packaging laminated structure.

The additive 19 of the lithium ion battery module coating material of the present invention can be applied to the heat-sealable layer by a gravure coating method (direct or reverse), a three-reverse-roll coating method, a kiss-roll coating method or a spray-coating method. When a liquid paraffin is used as the additive 19, a preferable weight per unit area of the liquid-paraffin layer is in the range of 1 to 6 $g/m^2$.

Desirably, the heat-sealable layer 14 of the lithium ion battery module packaging material of the present invention is a multilayer structure consisting of two or more layers (FIG. 9). The additive 19 is effective in improving the flexibility of the heat-sealable layer 14. However, it is possible that the additive 19 in a surface of the heat-sealable layer 14 bonded to another layer reduces the bond strength between the heat-sealable layer 14 and the layer bonded to the heat-sealable layer 14. The reduction of the bond strength between the heat-sealable layer 14 and the layer bonded to the heat-sealable layer 14 can be avoided by using a multilayer structure as the heat-sealable layer 14 and adding the additive 19 to the innermost layer of the multilayer structure (FIG. 9).

The component layers of the laminated structure 10 may be formed of the same materials as those mentioned in connection with the description of the first embodiment. The components of the laminated structures 10 in the second embodiment corresponding to those of the laminated structures in the first embodiment are denoted by the same reference characters and the description thereof will be omitted.

The construction and materials of the laminated structures in the second embodiment, excluding the construction of the heat-sealable layer 14 and the additive 19, are identical with those of the laminated structures in the first embodiment.

EXAMPLES

Examples of the lithium ion battery module packaging materials of the present invention will be described.

The chemical conversion treatment for processing the aluminum foil used an aqueous solution of a phenolic resin, a trivalent chromium fluoride compound and phosphoric acid as a processing liquid. The processing liquid was applied to the surface of the aluminum foil by a roll coating method in a film, and the film was baked at 180° C. or above. The weight per unit area of the film was 10 mg/m$^2$ (dry weight).

One-side pressed type embossed packages 5 each provided with a hollow part were formed by processing packaging laminated structures 10 in the following examples and comparative examples by using an embossing die 20 having a female die 22 provided with a cavity of 30 mm×50 mm×4.5 mm, and the formability of the packaging laminated structures 10 was evaluated.

When sealing a lithium ion battery module 1 in the embossed packages 5, 50 μm thick adhesive films 6 of an unsaturated carboxylic acid graft linear low-density polypropylene resin were wound round the tabs 4 of the lithium ion battery module 1 to seal gaps between the embossed package 5 and the tabs 4 by heat-sealing.

Example 2-1

Both the surfaces of a 40 μm thick aluminum foil were subjected to a chemical conversion treatment. A 25 μm thick oriented nylon film was laminated to one of the surfaces of the aluminum foil by a dry-lamination process. A 30 μm thick heat-sealable layer of a random polypropylene resin having an ethylene content of 4% was laminated to the other surface of the aluminum foil a dry-lamination process to obtain a sample packaging laminated structure in Example 2-1.

The film as the heat-sealable layer was formed by extruding a mixture of the random polypropylene resin and 5% by weight of a liquid paraffin by a T-die extrusion process.

Example 2-2

Both the surfaces of a 40 μm thick aluminum foil were subjected to a chemical conversion treatment. A 25 μm thick oriented nylon film was laminated to one of the surfaces of the aluminum foil by a dry-lamination process. The other chemically converted surface of the aluminum foil was heated with infrared rays and hot air to a temperature not lower than the softening point of an acid-denatured polypropylene resin, i.e., an adhesive resin. A 30 μm thick film of a random polypropylene resin having an ethylene content of 7% for forming a heat-sealable layer was laminated to the other surface of the aluminum foil with a 20 μm thick film of the acid-denatured polypropylene resin by a sandwich-lamination process to form a primary laminated structure. Four types of sample laminated structures in Example 2-2 were fabricated. The four types of sample laminated structures were provided with four different heat-sealable layers respectively formed of the following different random polypropylene resins 1) to 4) by an inflation method.

1) Mixture of a random polypropylene resin and 3% by weight of a liquid paraffin (Sample packaging laminated structure 2-2-1)

2) Mixture of a random polypropylene resin and 20% by weight of a fatty acid ester lubricant (VLT-L, commercially available from Kawaken Fine Chemical K.K.) prepared by dry blending (Sample packaging laminated structure 2-2-2)

3) Mixture of a random polypropylene resin and 0.5% by weight of a polyester dispersant (KFR-40, commercially available from Kawaken Fine Chemical K.K.) prepared by dry blending (Sample packaging laminated structure 2-2-3)

4) Mixture of a random polypropylene resin and 0.4% by weight of an antifogging agent (Kawaburaito K-3 121, commercially available from Kawaken Fine Chemical K.K.) prepared by dry blending (Sample packaging laminated structure 2-2-4)

Example 2-3

Both the surfaces of a 40 μm thick aluminum foil were subjected to a chemical conversion treatment. A 25 μm thick oriented nylon film was laminated to one of the surfaces of the aluminum foil by a dry-lamination process. A 20 μm thick molten adhesive resin film of a medium-density polyethylene resin was extruded onto the other surface of the aluminum foil and a 30 μm thick film of a linear low-density polyethylene for forming a heat-sealable layer was laminated to the other surface of the aluminum foil by a sandwich-lamination process, ozonizing a surface of the molten adhesive resin film facing the aluminum foil to form a primary laminated structure. The primary laminated structure was heated with hot air at a temperature not lower than the softening point of the acid-denatured polyethylene resin to obtain a sample packaging laminated structure in Example 2-3.

Example 2-4

Both the surfaces of a 40 μm thick aluminum foil were subjected to a chemical conversion treatment. A 25 μm thick oriented nylon film was laminated to one of the surfaces of the aluminum foil by a dry-lamination process. A 30 μm thick molten resin film of a medium-density polyethylene resin for forming a heat-sealable layer was laminated to the other surface of the aluminum foil by a extrusion-lamination process, ozonizing a surface of the molten resin film facing the aluminum foil, and a laminated structure thus formed was heated with infrared rays at a temperature not lower than the softening point of the medium-density polyethylene resin to obtain a primary laminated structure.

The inner surface of the layer of the random polypropylene resin was coated with a film of 4 g/m$^2$ of a liquid paraffin by a reverse-roll gravure coating method to obtain a sample packaging laminated structure in Example 2-4.

Comparative example 2-1

Both the surfaces of a 40 μm thick aluminum foil were subjected to a chemical conversion treatment. A 25 μm thick oriented nylon film was laminated to one of the surfaces of the aluminum foil by a dry-lamination process. A 30 μm thick film of a random polypropylene resin having an ethylene content of 4% for forming a heat-sealable layer was laminated to the other surface of the aluminum foil by a dry-lamination process to obtain a sample packaging laminated structure in Comparative example 2-1.

Comparative Example 2-2

Both the surfaces of a 40 μm thick aluminum foil were subjected to a chemical conversion treatment. A 25 μm thick oriented nylon film was laminated to one of the surfaces of the aluminum foil by a dry-lamination process. A 30 μm thick heat-sealable layer of a random polypropylene resin having an ethylene content of 7% was laminated with a 20 μm thick adhesive resin film of an acid-denatured polypropylene resin to the other surface of the aluminum foil heated at a temperature not lower than the softening point of the acid-denatured polypropylene resin with infrared rays and hot air by a sandwich-lamination process to obtain a sample packaging laminated structure in Comparative example 2-2.

Comparative Example 2-3

Both the surfaces of a 40 μm thick aluminum foil were subjected to a chemical conversion treatment. A 25 μm thick oriented nylon film was laminated to one of the surfaces of the aluminum foil by a dry-lamination process. A 20 μm thick molten adhesive resin film of a medium-density polyethylene resin was extruded onto the other surface of the aluminum foil and a 30 μm thick film of a linear low-density polyethylene resin for forming a heat-sealable layer was laminated to the other surface of the aluminum foil by a sandwich-lamination process, ozonizing a surface of the molten adhesive resin film facing the aluminum foil to form a primary laminated structure. The primary laminated structure was heated with hot air at a temperature not lower than the softening point of the acid-denatured polyethylene resin to obtain a sample packaging laminated structure in Comparative example 2-3.

Comparative Example 2-4

Both the surfaces of a 40 μm thick aluminum foil were subjected to a chemical conversion treatment. A 25 μm thick oriented nylon film was laminated to one of the surfaces of the aluminum foil by a dry-lamination process. A 30 μm thick molten resin film of a medium-density polyethylene resin was extruded onto the other surface of the aluminum foil, ozonizing a surface of the molten resin film facing the aluminum foil to form a primary laminated structure. The primary laminated structure was heated with infrared rays at a temperature not lower than the softening point of the medium-density polyethylene resin to obtain a sample packaging laminated structure in Comparative example 2-4.

Package Formation and Packaging

One hundred sample packaging laminated structures in each of Examples 2-4 to 2-4 and Comparative examples 2-1 to 2-4 were subjected to an embossing process to form sample embossed packages. The sample embossed packages were inspected visually. Lithium ion battery modules were packed in the sample embossed packages and the chemical resistance of the packaging laminated structures forming the sample embossed packages was examined.

Method of Evaluation

1) Formability

Samples were inspected for pinholes.

2) Changes in Surface of Heat-sealable Layer after Embossing

The surfaces of the heat-sealable layers of the packaging laminated structures forming the sample embossed packages were inspected visually immediately after embossing for whitening (slight cracking).

3) Chemical Resistance

Packaging laminated structures forming the sample embossed packages were inspected for the separation of the aluminum foil and the heat-sealable layer after keeping the sample embossed packages in an atmosphere of 60° C. and 90% RH in a thermostat for seven days.

Results

Pinholes were not formed at all by the embossing process in all the sample packaging laminated structures in Examples 1-1 to 1-4. None of the heat-sealable layers of the sample packaging laminated structures in Examples 1-1 to 1-4 was whitened by embossing. None of the sample packaging laminated structures in Examples 1-1 to 1-4 was delaminated by the agency of chemicals.

Five hundred sample packaging laminated structures in each of Comparative examples 1-1 to 1-4 were tested. Pinholes were formed in one or two of the five hundred sample packaging laminated structures in each of Comparative examples 2-1 to 2-4. None of the sample packaging laminated structures in Comparative examples 2-1 to 2-4 was not delaminated by the agency of chemicals. The heat-sealable layers of ten of the five hundred sample packaging laminated structures in each of Comparative examples 2-1 to 2-4 were slightly whitened. It was found through the observation of the whitened parts of the heat-sealable layers with an optical microscope at a 100× magnification that cracks of widths in the range of 5 to 20 μm and depths in the range of about 1 to about 2 μm were formed in the surfaces of the whitened parts of the heat-sealable layers.

The chemical conversion treatment of the surfaces of the aluminum foil prevents the separation of the base layer and the aluminum foil of the polymer battery module packaging materials of the present invention during an embossing process and heat-sealing. When the heat-sealable layer is bonded to the aluminum foil by a sandwich-lamination process or a coextrusion-lamination process, heating the laminated structure during the fabrication or after the fabrication of the same prevents effectively the corrosion of the surface of the aluminum foil by hydrogen fluoride that may be produced by interaction between the electrolyte of the polymer battery module and moisture, and the separation of the heat-sealable layer from the aluminum foil can be prevented. The addition of one or some of additives including liquid paraffins, fatty acid ester lubricants, dispersants, such as polyester surface active agents, and an antifogging agent, such as polyglycerol ester, in the heat-sealable layer improves the slipperiness, flexibility and stretchability of the heat-sealable layer, improves the emboss-formability of the packaging laminated structure, stabilizes the forming process even if the heat-sealable layer is formed of a random polypropylene resin or a polyethylene resin having low slipperiness, and prevents the formation of cracks in the heat-sealable layer.

What is claimed is:

1. A polymer battery module packaging material comprising:
   a base layer,
   a barrier layer,
   a chemically converted layer,
   a heat-ealable layer, and
   a liquid paraffin layer;
   wherein the heat-sealable layer is formed of a polyolefin resin.

2. A polymer battery module packaging material comprising:
   a base layer,
   a barrier layer,
   a chemically converted layer,
   a heat-sealable layer, and
   a liquid paraffin layer;
      wherein (1) the heat-sealable layer is formed of a polyolefin resin, and
      (2) the liquid paraffin layer is provided on the heat-sealable layer as an innermost layer.

3. The polymer battery module packaging material according to claim 2, wherein the heat-sealable layer is formed of a random polypropylene resin.

4. The polymer battery module packaging material according to claim 2, wherein the heat-sealable layer is formed of a linear low-density polyethylene resin.

5. The polymer battery module packaging material according to claim 2, wherein the heat-sealable layer includes one or more fatty ester lubricants, polyester dispersants, and polyglycerol ester additives.

6. The polymer battery module packaging material according to claim 2, wherein the heat-sealable layer is a multilayer structure consisting of two or more layers, and at least an innermost layer of the multilayer structure contains one or more of liquid paraffin, fatty acid ester lubricants, polyester dispersants, and polyglycerol ester additives.

7. A polymer battery module packaging material according to claim 2, wherein the chemically converted layer is formed by a phosphate chromate treatment using a mixture of a phenolic resin, trivalent chromium phosphate compound, and phosphoric acid.

8. The polymer battery module packaging material according to claim 2, wherein the battery layer is a foil of aluminum having a thickness in the range of 15 to 80 $\mu$m, and an iron content in the range of 0.7 to 2.0%, by weight.

9. The polymer battery module packaging material according to claim 2, wherein the heat-sealable layer includes a liquid paraffin.

10. The polymer battery module packaging material according to claim 9, wherein the heat-sealable layer includes one or more fatty acid ester lubricants, polyester dispersants, and polyglycerol ester additives.

11. A polymer battery module packaging material manufacturing method comprising the steps of:
   processing at least one of a surface of a barrier layer by a chemical conversion treatment,
   laminating a base layer to one of the surfaces of the barrier layer by a dry-lamination process,
   forming a packaging laminated structure by forming a heat-sealable layer by bonding a random polypropylene resin film to the other surface processed by the chemical conversion treatment of the barrier layer with an adhesive resin layer of an acid-denatured polypropylene resin,
   heating the packaging laminated structure at a temperature not lower than the softening point of the acid-denatured polyolefin resin, and
   coating a surface of the heat-sealable layer of the random polypropylene resin with a liquid paraffin.

12. The polymer battery module packaging material manufacturing method according to claim 11, wherein the heat-sealable layer is bonded to a barrier layer with the adhesive resin layer by a sandwich-lamination process.

13. The polymer battery module packaging material manufacturing method according to claim 11, wherein the heat-sealable layer is bonded to a barrier layer with the adhesive resin layer by a coextrusion-lamination process.

14. The polymer battery module packaging material manufacturing method according to claim 11, wherein the steps of coating the heat-sealable layer with the liquid paraffin and heating the packaging laminated structure are carried out in in-line processes.

15. The polymer battery module packaging material manufacturing method according to claim 11, wherein the step of coating the heat-sealable layer with the liquid paraffin is a discrete step to be carried out after the step of heating the packaging laminated structure.

16. The polymer battery module packaging material manufacturing method according to claim 11, wherein both surfaces of the barrier layer are processed by the chemical conversion treatment.

17. A polymer battery module packaging material manufacturing method comprising the steps of:
   processing at least one of a surface of a barrier layer by a chemical conversion treatment,
   laminating a base layer to one of the surfaces of the barrier layer by a dry-lamination process,
   forming a packaging laminated structure by heating the other surface processed by the chemical conversion treatment of the barrier layer at a temperature not lower than the softening point of an acid-denatured polypropylene resin and bonding a heat-sealable layer of a random polypropylene resin film to the other surface processed by the chemical conversion treatment of the barrier layer with an adhesive resin layer of the acid-denatured polypropylene resin, and
   coating a surface of the heat-sealable layer of the random polypropylene resin with a liquid paraffin.

18. The polymer battery module packaging material manufacturing method according to claim 17, wherein the steps of coating the heat-sealable layer with the liquid paraffin and heating the packaging laminated structure are carried out in in-line processes.

19. The polymer battery module packaging material manufacturing method according to claim 17, wherein the step of coating the heat-sealable layer with the liquid paraffin is a discrete step to be carried out after the step of heating the packaging laminated structure.

20. The polymer battery module packaging material manufacturing method according to claim 17, wherein both surfaces of the barrier layer are processed by the chemical conversion treatment.

21. A polymer battery module packaging material manufacturing method comprising the steps of:
   processing at least one of a surface of a barrier layer by a chemical conversion treatment,
   laminating a base layer to one of the surfaces of the barrier layer by a dry-lamination process,
   forming a packaging laminated structure by forming a heat-sealable layer by bonding a film of a linear low-density polyethylene resin to the other surface processed by the chemical conversion treatment of the barrier layer with an adhesive resin layer of an acid-denatured linear low-density polyethylene resin by a sandwich-lamination process,
   heating the packaging laminated structure at a temperature not lower than the softening point of the acid-denatured linear low-density polyethylene resin, and
   coating a surface of the heat-sealable layer of the linear low-density polyethylene resin with a liquid paraffin.

22. The polymer battery module packaging material manufacturing method according to claim 21, wherein the steps of coating the heat-sealable layer with the liquid paraffin and heating the packaging laminated structure are carried out in in-line processes.

23. The polymer battery module packaging material manufacturing method according to claim 21, wherein the step of coating the heat-sealable layer with the liquid paraffin is a discrete step to be carried out after the step of heating the packaging laminated structure.

24. The polymer battery module packaging material manufacturing method according to claim 21, wherein both surfaces of the barrier layer are processed by the chemical conversion treatment.

25. A polymer battery module packaging material manufacturing method comprising the steps of:

processing at least one of a surface of a barrier layer by a chemical conversion treatment, laminating a base layer to one of the surfaces of the barrier layer by a dry-lamination process, forming a packaging laminated structure by forming a layer of an acid-denatured polypropylene resin and a film of a random polypropylene resin on the other surface processed by the chemical conversion treatment of the barrier layer by a thermal-lamination process, heating the laminated structure at a temperature not lower than the melting point of the acid-denatured polypropylene resin, and coating a surface of the film of the random polypropylene resin of the packaging laminated structure with a liquid paraffin.

26. The polymer battery module packaging material manufacturing method according to claim 25, wherein the steps of coating the heat-sealable layer with the liquid paraffin and heating the packaging laminated structure are carried out in in-line processes.

27. The polymer battery module packaging material manufacturing method according to claim 25, wherein the step of coating the heat-sealable layer with the liquid paraffin is a discrete step to be carried out after the step of heating the packaging laminated structure.

28. The polymer battery module packaging material manufacturing method according to claim 25, wherein both surfaces of the barrier layer are processed by the chemical conversion treatment.

* * * * *